US008965276B2

(12) United States Patent
Bongfeldt et al.

(10) Patent No.: US 8,965,276 B2
(45) Date of Patent: Feb. 24, 2015

(54) RADIO ANTENNA ASSEMBLY AND APPARATUS FOR CONTROLLING TRANSMISSION AND RECEPTION OF RF SIGNALS

(75) Inventors: David Charles Bongfeldt, Stittsville (CA); Niclas Lewis, Ottawa (CA); Trevor Noel Yensen, Ottawa (CA)

(73) Assignee: Allen-Vanguard Corporation, Ottawa, ON ( * ) Notice: Subject to any disclaimer, the term of this patent is extended or adjusted under 35 U.S.C. 154(b) by 1367 days.

(21) Appl. No.: 12/675,484

(22) PCT Filed: Aug. 29, 2008

(86) PCT No.: PCT/CA2008/001540
§ 371 (c)(1),
(2), (4) Date: Feb. 28, 2011

(87) PCT Pub. No.: WO2009/026719
PCT Pub. Date: Mar. 5, 2009

(65) Prior Publication Data

US 2011/0151779 A1 Jun. 23, 2011

Related U.S. Application Data

(60) Provisional application No. 61/048,421, filed on Apr. 28, 2008, provisional application No. 60/969,305, filed on Aug. 31, 2007.

(51) Int. Cl.

| | |
|---|---|
| ***H04B 7/24*** | (2006.01) |
| ***H01Q 1/32*** | (2006.01) |
| ***H01Q 3/38*** | (2006.01) |
| ***H01Q 9/18*** | (2006.01) |

(Continued)

(52) U.S. Cl.
CPC ............ *H01Q 1/1242* (2013.01); *H01Q 1/325* (2013.01); *H01Q 3/38* (2013.01); *H01Q 9/18* (2013.01); *H01Q 21/08* (2013.01)
USPC .............................. 455/39; 343/878; 455/129

(58) Field of Classification Search
CPC .. H04B 7/0408; H04B 7/0617; H04B 7/0695; H04B 7/088; H01Q 1/1242; H01Q 1/325
USPC .................. 455/63.4, 39, 129; 342/368, 372; 340/5.72, 539.13
See application file for complete search history.

(56) References Cited

U.S. PATENT DOCUMENTS 3,911,438 A * 10/1975 Banks .......................... 342/424
5,364,049 A 11/1994 Long (Continued)

FOREIGN PATENT DOCUMENTS

CA 2462721 10/2004
CA 2560382 3/2007

(Continued)

*Primary Examiner* — Yuwen Pan
*Assistant Examiner* — Ayodeji Ayotunde
(74) *Attorney, Agent, or Firm* — McMillan LLP

(57) ABSTRACT

An apparatus includes an antenna for transmitting RF radiation and being structured to enable the distribution of RF energy emitted therefrom to be varied in the vertical plane. The apparatus comprises a generator for generating an RF signal and to pass the signal to the antenna, and a controller arranged to control the distribution of RF energy emitted from the antenna in the vertical plane in response to positional information about an object.

51 Claims, 20 Drawing Sheets

(51) Int. Cl.

| | |
|---|---|
| ***H01Q 21/08*** | (2006.01) |
| *H01Q 1/12* | (2006.01) |
| *H04B 1/04* | (2006.01) |

(56) References Cited

U.S. PATENT DOCUMENTS

| | | | | |
|---|---|---|---|---|
| 6,225,954 | B1 | 5/2001 | Edvardsson | |
| 6,366,237 | B1 | 4/2002 | Charles | |
| 6,369,756 | B1 * | 4/2002 | Wang et al. | 342/367 |
| 7,202,826 | B2 | 4/2007 | Grant | |
| 2002/0067250 | A1 * | 6/2002 | Kamlah | 340/436 |
| 2002/0089451 | A1 * | 7/2002 | Wang et al. | 342/458 |
| 2006/0044196 | A1 * | 3/2006 | Grant et al. | 343/713 |
| 2008/0084345 | A1 * | 4/2008 | Rougas et al. | 342/14 |
| 2009/0140921 | A1 * | 6/2009 | Bongfeldt et al. | 342/372 |

FOREIGN PATENT DOCUMENTS

| | | | |
|---|---|---|---|
| EP | 0624919 | | 11/1994 |
| EP | 0980111 | | 2/2000 |
| GB | 2384369 | | 7/2003 |
| JP | 2001119217 | | 4/2001 |
| WO | 9613075 | A1 | 5/1996 |
| WO | 2004091106 | | 10/2004 |
| WO | 2007091024 | | 8/2007 |

* cited by examiner

RADIO ANTENNA ASSEMBLY AND APPARATUS FOR CONTROLLING TRANSMISSION AND RECEPTION OF RF SIGNALS

FIELD OF THE INVENTION

The present invention relates to radio antennas and antenna assemblies and in particular, but not limited to, antennas and antenna assemblies for vehicles and other mobile units.

BACKGROUND OF THE INVENTION

Vehicle mounted radio antennas are generally known for receiving radio broadcast signals and for two-way communication in mobile telephone applications. Vehicle mounted antenna are also known for voice communications in military applications.

In static applications, a known antenna assembly comprises an antenna array comprising several vertically stacked dipole antennas each of which operates over the same frequency band. In transmission mode, each antenna is fed the same carrier frequency signal with the signal fed to the upper and lower antennas being phase shifted relative to middle antenna to increase the concentration of electromagnetic energy in the horizontal direction.

SUMMARY OF THE INVENTION

The inventors have discovered that when transmitting at certain frequencies from a vehicle mounted antenna, the signal strength is significantly lower than expected in certain regions in close proximity to the vehicle, and that such regions of lower than expected signal strength occur particularly for higher frequencies and where the vehicle significantly shadows and scatters the signal. Thus, as the vehicle moves towards an object, such as a receiver, the signal strength fades significantly when the vehicle is in close proximity with the receiver resulting in the receiver receiving less than the desired signal strength. In some applications, the signal emitted by the antenna comprises a jamming signal and the receiver may be a receiver for a remote controlled explosive device, for example. Accordingly, fading of the jamming signal when the vehicle is in close proximity to the receiver may render the jamming signal ineffective, and enable the explosive device to be remotely detonated.

In view of the above, it would be desirable to provide an improved antenna assembly which is capable of producing adequate signal strength and coverage in close proximity to the vehicle or other support on which it is mounted.

According to one aspect of the present invention, there is provided an antenna assembly for mounting on a predetermined support structure positioned on a surface, said support structure having a peripheral edge at an elevated position above the surface, the antenna assembly comprising an antenna and a support for supporting the antenna at an elevated position above said surface, when mounted on said support structure, wherein the support is adapted to support the antenna at a sufficient height above said surface to provide a direct path for electromagnetic radiation from at least a portion of the antenna to a position on the surface external of the peripheral edge, of less than or equal to about 4.5 meters from substantially any point on the peripheral edge, or to a position on the surface at a point positioned a first predetermined distance from the front of the support structure and a predetermined distance from a side of the support structure, or to a position on the surface a predetermined distance from the center of the support structure.

Thus, where the position on the surface is less than or equal to about 4.5 meters from substantially any point on the peripheral edge, the antenna has a direct line of sight to substantially all positions along the peripheral edge spaced a distance of 4.5 meters from the peripheral edge.

The inventors have determined that at certain frequencies, the vehicle's metallic shell causes significant shadowing, reflecting and scattering of electromagnetic radiation emitted by an antenna mounted on the exterior of the vehicle. Mounting the antenna at a sufficient height to provide a direct line of sight from at least a portion of the antenna to a region within close proximity to the vehicle substantially improves uniformity of the signal strength around the vehicle and reduces both the number and depth of spatial nulls. The inventors have further determined that, although interference of the direct path signal by out-of-phase, indirect path signals, for example, scattered from the vehicle surface, causes some attenuation of the direct path signal, the direct path signal is significantly stronger than the scattered multi-path signals and therefore the amount of attenuation of the direct path signal is relatively small.

For the purpose of determining the position from the peripheral edge of the support structure, the surface may be a planar surface.

Certain features of support structure are predetermined. For example, the support structure has predetermined dimensions, including length, width and possibly height above the surface, the shape of the peripheral edge and the height of different portions of the peripheral edge above the surface. Different portions of the upper surface of the support structure may be at different levels above the surface. The position on the support structure (and its height above the surface) for mounting the antenna assembly may also be predetermined.

In some embodiments, the support is arranged so that when mounted on the support structure, the antenna is positioned at a sufficient height above the surface to provide a direct path for electromagnetic radiation from at least a portion of the antenna to a position on the surface external of the peripheral edge of less than or equal to 3.6 meters from substantially any point on the peripheral edge.

In some embodiments, the antenna is configured for transmitting electromagnetic radiation over a substantially full azimuthal range of angles, i.e. over an azimuthal range of substantially 360°.

In some embodiments, the magnitude of the electromagnetic energy radiated from the antenna varies with angle of elevation of the radiated energy.

In some embodiments, the magnitude of the electromagnetic energy has a range of values between a maximum value at a first angle of elevation and a predetermined lower value at a second angle of elevation, and the longest direct path from the antenna to the position on the surface has an angle between the first and second angles, inclusive. In some embodiments, the predetermined lower value may be about 3 dB below the maximum value. Thus, in this embodiment, an upper limit is placed on the height of the antenna above the surface, so that at the predetermined position at the surface, the RF signal has a strength at or above a predetermined minimum value.

In some embodiments, the longest direct path from the antenna to the position on the surface forms an angle with the vertical greater than or equal to a predetermined minimum angle. The predetermined minimum angle may be an angle where the magnitude of electromagnetic radiation is between a maximum value and a predetermined value of less than the maximum value. The predetermined value may for example be about 3 dB below the maximum value.

In some embodiments, the antenna assembly further comprises biasing means for biasing the spread of electromagnetic radiation emitted from the antenna in a downward direction. Thus, in this embodiment, for a vertical antenna, more electromagnetic radiation emitted from the antenna is directed below the horizontal than above the horizontal. Advantageously, this arrangement may increase the amount of electromagnetic radiation received at the position on the surface.

In some embodiments, the biasing means comprises a second antenna.

In some embodiments, the antenna is configured to bias the spread of electromagnetic radiation downwardly. This may be achieved by configuring the antenna asymmetrically. For example, in the case of a dipole antenna, or where the antenna comprises two radiating elements, the lower element may be longer than the upper element, and/or an additional element may be provided which capacitively couples with the lower element more than with the upper element.

In some embodiments, the first antenna has upper and lower ends, the second antenna has upper and lower ends, and wherein the upper end of the second antenna is below the upper end of the first antenna.

In some embodiments, the antenna assembly further comprises an RF signal source coupled to the first and second antennas and for providing an RF signal having a first frequency to the first antenna and an RF signal having a second frequency to the second antenna. The first frequency may be different from the second frequency, and in some embodiments, the second frequency is below the first frequency.

In some embodiments, the second signal has a different phase to the first signal.

In some embodiments, an RF signal is applied to each of the first and second antennas such that at least one common frequency or frequency band is applied to both antennas. The common frequency or frequency band applied to the first antenna may have a different phase to the common frequency or frequency band applied to the second antenna to bias the direction of emitted radiation downwardly.

In some embodiments, the RF signal applied to the first and/or second antenna includes one or more different frequency(ies) to the frequency(ies) applied to the other of the first and second antenna.

In some embodiments, the antenna assembly further comprises control means for controlling the elevational direction of electromagnetic radiation emitted from the antenna.

In some embodiments, the antenna assembly comprises means for concentrating the elevational spread of electromagnetic radiation emitted from the first antenna. In some embodiments, the concentrating means comprises a second antenna.

In some embodiments, the area of the support within the peripheral edge is substantially opaque to electromagnetic radiation emitted from the antenna. In some embodiments, the area of the support within the peripheral edge has no direct path from the antenna to the surface.

In some embodiments, the support comprises a mobile support. The support may, for example, comprise a vehicle. In some embodiments, the vehicle comprises a military vehicle.

In some embodiments, the support has opposed ends and a center, midway between the opposed ends, and the antenna is offset from the center towards one of the ends. The opposed ends may comprise a front end and a rear end of the support, and the antenna may be offset towards the rear end.

In some embodiments, the support has opposed sides and a center between the opposed sides and the antenna is offset from the center towards one of the opposed sides.

In some embodiments, the antenna comprises a ground plane independent antenna, for example, one of a bicone antenna and a dipole antenna.

In some embodiments, the antenna is limited to operate within a predetermined frequency band, wherein the frequency band is within a range having a lower frequency of about 200 MHz. The inventors have found that for the particular type of vehicle tested whose length is about 5 m, and for frequencies of 200 MHz and above, a direct line of sight from the antenna to the position on the surface substantially increases signal strength at the position and reduces the depth of spatial nulls.

In some embodiments, the minimum frequency to be radiated by the antenna having a direct line of sight to the critical position on the surface is related to the length of the vehicle. In one embodiment, the minimum frequency is determined as that for which the ratio $l/\lambda$ is in the range 2.5 to 4, for example 3 to 3.5, where $l$ is the length of the vehicle (or support) and $\lambda$ is the wavelength of the RF signal.

In some embodiments, the antenna assembly further comprises a second antenna supported by the support.

In some embodiments, the support is adapted to support the second antenna at a sufficient height above the surface to provide a substantially direct path for transmission of electromagnetic radiation from at least a portion of the second antenna to a position at the surface of less than or equal to 3 meters (for example equal to or less than 2.5 meters) from substantially any point on the peripheral edge.

In some embodiments, the first antenna has opposed upper and lower ends, the second antenna has opposed upper and lower ends, and the upper end of the second antenna is positioned below the upper end of the first antenna.

In some embodiments, the upper end of the second antenna is adjacent the lower end of the first antenna. In some embodiments, the second antenna is positioned to capacitively couple with the first antenna. In some embodiments, a portion of the length of the second antenna overlaps a portion of the length of the first antenna.

In some embodiments, the first and second antennas each have a longitudinal axis and the axes are substantially coaxially aligned.

In some embodiments, the second antenna at least partially supports the first antenna.

In some embodiments, the first antenna is limited to operate over a first frequency band between first upper and first lower frequencies and the second antenna is limited to operate over a second frequency band between a second upper frequency and a second lower frequency, wherein the second upper frequency is below the first upper frequency.

In some embodiments, the first lower frequency is substantially adjacent the second upper frequency. Thus, the frequency bands may or may not partially overlap.

In some embodiments, the antenna assembly further comprises biasing means for biasing the elevational spread of electromagnetic radiation emitted from the second antenna in a downward direction.

In some embodiments, the antenna assembly further comprises means for concentrating the spread of electromagnetic radiation emitted from the second antenna.

In some embodiments, the antenna assembly further comprises a third antenna supported by the support at an elevated position above the surface.

In some embodiments, the third antenna has upper and lower ends, and the upper end of the third antenna is positioned below the upper end of the second antenna.

In some embodiments, the upper end of the third antenna is positioned substantially adjacent the lower end of the second antenna. In some embodiments, the third antenna is positioned to capacitively couple with the second antenna. In some embodiments, a portion of the length of the third antenna overlaps a portion of the length of the second antenna.

In some embodiments, the third antenna has an axis extending between its first and second ends, and the axis is substantially coaxially aligned with the axis of at least one of the first and second antennas.

In some embodiments, the third antenna at least partially supports at least one of the first and second antennas.

In some embodiments, the third antenna is limited to operate efficiently over a predetermined frequency having upper and lower frequencies, and wherein the upper frequency of the third antenna is below the upper frequency of the second antenna.

In some embodiments, the upper frequency of the third antenna is substantially adjacent the lower frequency of the second antenna.

In some embodiments, the third antenna comprises a ground plane independent antenna, e.g. a bicone antenna or dipole antenna.

The second antenna may comprise a ground plane independent antenna, e.g. a bicone antenna or dipole antenna.

In some embodiments, the support includes mounting means for mounting the antenna assembly on a vehicle.

According to another aspect of the present invention, there is provided an antenna assembly comprising an antenna, a support for supporting the antenna at an elevated position above a surface, the support having a peripheral edge positioned above the surface, wherein the support structure is adapted to support the antenna at a sufficient height above said surface to provide a direct path for electromagnetic radiation from at least a portion of the antenna to a position on the surface external of the peripheral edge, of less than or equal to about 4.5 meters from substantially any point on the peripheral edge, or to a position on the surface at a point positioned a first predetermined distance from the front of the support and/or a predetermined distance from a side of the support, or to a position on the surface a predetermined distance from the center of the support.

According to another aspect of the present invention, there is provided an antenna assembly comprising a first antenna limited to operate over a first frequency band between a first upper and a first lower frequency, the antenna having opposed upper and lower ends, a second antenna limited to operate over a second frequency band between a second upper frequency and a second lower frequency, the second antenna having opposed upper and lower ends, wherein the second upper frequency is different from the first upper frequency, and support means for supporting the first antenna at a position above the second antenna such that the upper end of the second antenna is below the upper end of the first antenna.

In some embodiments, the second upper frequency is below the first upper frequency.

In some embodiments, the antenna assembly further comprises biasing means for biasing the elevational spread of electromagnetic radiation emitted from at least one of the first and second antennas downwardly.

In some embodiments, the antenna is configured to bias the spread of electromagnetic radiation downwardly. This may be achieved by configuring the antenna asymmetrically. For example, in the case of a dipole antenna, or where the antenna comprises two radiating elements, the lower element may be longer than the upper element, and/or an additional element may be provided which capacitively couples with the lower element more than with the upper element.

In some embodiments, the biasing means comprises a controller for controlling at least one of the relative frequency and relative phase of the electromagnetic radiation emitted from at least one of the first and second antennas.

In some embodiments, the upper end of the second antenna is substantially adjacent the lower end of the first antenna.

In some embodiments, each of the first and second antennas has an axis extending between the respective opposed ends thereof, and the axis of the first and second antennas are substantially coaxially aligned.

In some embodiments, the second antenna at least partially supports the first antenna.

In some embodiments, one or more of the first and second antennas comprises a ground plane independent antenna, e.g. a bicone antenna or a dipole antenna.

In some embodiments, the antenna assembly further comprises a signal source coupled to at least one of the first and second antennas for providing a jamming signal thereto.

In some embodiments, one or more of the first and second antennas is capable of transmitting electromagnetic radiation over substantially the full range of azimuthal angles.

According to another aspect of the present invention, there is provided an antenna assembly comprising an antenna for emitting radio frequency electromagnetic radiation therefrom and biasing means for biasing the elevational spread of electromagnetic radiation emitted from the antenna downwardly.

In some embodiments, the antenna is configured to bias the spread of electromagnetic radiation downwardly. This may be achieved by configuring the antenna asymmetrically. For example, in the case of a dipole antenna, or where the antenna comprises two radiating elements, the lower element may be longer than the upper element, and/or an additional element may be provided which capacitively couples with the lower element more than with the upper element.

In some embodiments, the antenna is capable of transmitting electromagnetic radiation over substantially the full range of azimuthal angles.

In some embodiments, the biasing means comprises a second antenna.

In some embodiments, the second antenna has upper and lower ends, in which the upper end is positioned below the upper end of the first antenna.

In some embodiments, the biasing means comprises a controller for controlling at least one of the relative frequency and relative phase of electromagnetic radiation emitted from at least one of the first and second antennas.

In some embodiments, the antenna assembly further comprises concentrating means for concentrating the spread of electromagnetic radiation emitted from the antenna.

In some embodiments, the antenna assembly comprises a signal source coupled to at least one of the first and second antennas for providing a jamming signal thereto.

In some embodiments, one or more of the first and second antennas comprises a ground plane independent antenna, e.g. a bicone antenna or a dipole antenna.

According to another aspect of the present invention, there is provided an antenna assembly comprising one or more antennas including a first antenna, mounting means for mounting the antenna to a vehicle, concentrating means for concentrating the spread of electromagnetic radiation emitted from the antenna and a signal source coupled to the antenna for providing a jamming signal thereto.

In some embodiments, one or more of the antennas is configured for transmitting electromagnetic radiation over substantially the full range of azimuthal angles.

In some embodiments, the concentrating means comprises a second antenna.

In some embodiments, the concentrating means may further comprise a controller for controlling at least one of the relative frequency and relative phase of electromagnetic radiation emitted from at least one of the first and second antennas.

According to another aspect of the present invention, there is provided an antenna assembly comprising an antenna, a support for supporting the antenna at an elevated position above a surface, the support having a peripheral edge positioned above the surface, wherein the support is adapted to support the antenna at a sufficient height above said surface to provide a direct path for electromagnetic radiation from at least a portion of the antenna to any position between opposed ends of the support that is spaced at least one of (1) about 2.5 to 3 meters or (2) less than about 2.5 to 3 meters from a side of said support.

Thus, in this arrangement, the antenna has a direct line of sight at least to substantially all positions along a side of the support structure between the ends, which are spaced 3 meters from the side.

In some embodiments, the antenna is positioned centrally between the two sides of the support structure, or offset to one side (i.e. the other side) so that the direct path must traverse at least half the width or more of the support structure to the positions on the surface.

According to another aspect of the present invention, there is provided an antenna assembly comprising an antenna, a support for supporting the antenna at an elevated position above a surface, the support having a peripheral edge positioned above the surface, wherein the support is adapted to support the antenna at a sufficient height above the surface to provide a direct path for electromagnetic radiation from at least a portion of the antenna to a position on the surface external of the peripheral edge spaced about 2.5 to 3 meters from one or both ends of said support or less than about 2.5 to 3 meters from one or both ends of said support and between a side of said support and about 2.5 to 3 meters from said side.

Thus, in this arrangement, the antenna has a direct line of sight to a position spaced both 3 meters from an end and 3 meters from a side of the support structure.

In some embodiments, the antenna has a direct line of sight from the antenna to all positions spaced both 3 meters from one or both ends and between a side and 3 meters from the side.

In some embodiments, the antenna is positioned on the support structure either centrally between the sides and/or ends or offset towards a side and/or an end. The direct path may traverse at least half or more than half of the width and/or length of the support structure to reach the position on the surface.

According to another aspect of the present invention, there is provided an antenna assembly for mounting on a support structure positioned on the surface and having a peripheral edge, the antenna assembly comprising an antenna and a support for supporting the antenna on the support structure wherein the support is configured to support the antenna at a sufficient height above said surface when mounted on said support structure to provide a direct path for electromagnetic radiation from at least a portion of the antenna to a position on the surface external of the peripheral edge, wherein said position comprises any one or more of the positions disclosed or claimed herein.

According to another aspect of the present invention, there is provided a method of designing an antenna support comprising selecting a support structure on which to mount the antenna, the support structure having a peripheral edge, selecting a position on the support structure on which to mount the antenna, determining a height for the antenna, when mounted at said selected position, to provide a direct path from at least a portion of the antenna to a position on a surface below the selected support structure and spaced externally of a peripheral edge of the support structure by a distance of any one or more of (1) less than or equal to about 3.6 to 4.5 meters from substantially any point on the peripheral edge, (2) a position at any point between opposed ends of said support which is spaced about 2.5 to 3 meters or less from a side of said support structure, (3) a position of about 2.5 to 3 meters or less than 2.5 to 3 meters from aside of said support structure and about 2.5 to 3 meters or less from one or both ends of said support structure and (4) a position of about 2.5 to 3 meters from an end of said support structure and between a side of said support structure and about 2.5 to 3 meters from said side, and designing a support for mounting on the support structure and for supporting the antenna at the determined height.

According to another aspect of the present invention, there is provided an antenna for radiating electromagnetic radiation having opposed ends and a structure which biases the direction of radiation emitted outwardly from the antenna towards one of said ends.

According to another aspect of the present invention, there is provided an apparatus comprising antenna means for transmitting RF radiation and being structured to enable the distribution of RF energy emitted therefrom to be varied in the vertical plane, signal generator means for generating an RF signal and adapted to pass said signal to said antenna means, and a controller arranged to control the distribution of RF energy emitted from the antenna in the vertical plane.

Advantageously, this arrangement allows the distribution of RF energy emitted from an antenna to be varied in the vertical plane, thereby allowing the effective direction or "beam" of radiation to be steered. Controlling the elevational angle or direction of the beam allows, for example, the lateral or horizontal range of the radiation pattern to be varied. For example, the radiation pattern may have an extended range when directed towards the horizon, and a shorter range (in free space) when tilted downwardly so that the beam intercepts the ground surface.

In some embodiments, the controller is responsive to positional information about an object and is adapted to control the distribution of RF energy emitted from the antenna in response to the positional information. For example, the controller may be adapted to steer the distribution of RF energy towards the object, and/or to vary the distribution of RF energy depending on the positional relationship between the apparatus and the object. The positional relationship may, for example, be the distance between the apparatus and the object, or an approximation or indication thereof. For example, the distance may be derived from a measurement of the distance between the apparatus and another object, where the positional relationship between the two objects is known or assumed.

The antenna means and controller may be arranged to control the distribution of RF energy emitted from the same part of the antenna. In other words, in this embodiment, the RF distribution in a particular direction is not varied by rotating an antenna whose horizontal emission pattern is asymmetric. In some embodiments, the RF radiation is emitted symmetrically in all azimuthal directions.

In some embodiments, determining means is provided for determining a positional relationship between the antenna means and an object, and wherein the controller is adapted to control the distribution of RF energy based on the determined positional relationship. In some embodiments, the determining means may be part of the apparatus. In other embodiments, the determining means may be separate from the apparatus, and possibly located remotely therefrom and adapted to communicate with the controller.

In some embodiments, the apparatus further comprises a receiver for receiving an RF signal, and wherein the determining means is adapted to determine the positional relationship based on the received RF signal. The RF signal may be emitted from the object itself whose positional relationship with the apparatus is determined, or by another device which is associated with the object, and which may control the object, but is not necessarily co-located therewith. For example, the object may be a remote controlled explosive device, and the source of the RF signal may comprise a transmitter for controlling detonation of the explosive. In other embodiments, the source of the RF signal may comprise a communication device for communicating with the apparatus, for example, a roadside beacon for communicating with a vehicle on which the apparatus is mounted or installed.

In some embodiments, the apparatus further comprises detector means for detecting a parameter of the received RF signal, and wherein the determining means is adapted to determine the positional relationship based on the parameter. The parameter may comprise the strength (e.g. power level) of the RF signal or any parameter associated with signal strength, for example, the direction of change of signal strength or the rate of change of signal strength.

In some embodiments, the antenna means comprises a plurality of antennas including first and second antennas in which at least a portion of the first antenna is at a different vertical position than the second antenna. The signal generator means may be adapted to pass an RF signal to each of the first and second antennas. A phase controller may be provided to control the phase relationship between the first and second RF signals and thereby to control the distribution of RF energy emitted from the antenna means in the vertical plane. Thus, embodiments of the invention exploit the high gain and directionality provided by phased-array antenna technology. By combining multiple, vertically-stacked antennas together and adaptively steering the vertical beam, higher omni-directional gain can be achieved, without sacrificing coverage for jamming signals, communication signals or other signals over a wide range of distances.

In some embodiments, the apparatus further comprises comparing means for comparing the signal strength with a predetermined threshold value.

The determining means may be adapted to determine the positional relationship based on the result of the comparison made by the comparing means. In some embodiments, means may be provided for enabling the threshold value to be varied. Storage means may be provided for storing a plurality of different threshold values. Each threshold value may be derived from a source of known signal strength, for example. At least one source of known signal strength may comprise, for example, a fixed position RF transmitter or a mobile RF transmitter.

In some embodiments, the apparatus may further comprise detecting means for detecting a change in the value of the parameter. Means may further be provided for selecting a threshold value based on the detected change. In some embodiments, the detecting means is adapted for detecting a direction of change in the parameter and the selection means may be adapted to select the value of a threshold based on the detected direction of change in the parameter.

In some embodiments, the controller is adapted to vary the distribution of RF energy between a first distribution and a second distribution, wherein the second distribution of RF energy emitted from the antenna is biased or directed downwardly relative to the first distribution.

The controller may be arranged to select the first distribution, if the received signal strength is at or below a predetermined threshold value. In some embodiments, means may be provided for detecting the direction of change of the signal strength, and the controller is arranged to select the first distribution if the signal strength is decreasing with time.

In some embodiments, the apparatus further comprises means for measuring a rate of change in signal strength, and the controller is arranged to select the first distribution if the measured rate of change is below a predetermined threshold value.

The controller may be arranged to select the second distribution if the signal strength is at or above a predetermined value.

In some embodiments, the apparatus further comprises a detector for detecting the direction of change in signal strength, and the controller is arranged to select the second distribution if the signal strength increases with time.

In some embodiments, the apparatus further comprises a detector for detecting the rate of change of signal strength, and the controller is arranged to select the second distribution if the rate of change is at or above a predetermined threshold value.

In some embodiments which include a receiver, the receiver includes the antenna means. The antenna means may include first and second antennas.

In some embodiments, the determining means is adapted to determine positional information of an object, for example, the distance between the apparatus and the object, based on an RF signal received at the first antenna and an RF signal received at the second antenna.

In some embodiments, the determining means is adapted to determine the positional relationship based on a phase relationship between the RF signal received at the first antenna and the RF signal received at the second antenna.

In some embodiments, the determining means comprises a detector for detecting a phase difference between the first and second received RF signals. In some embodiments, the detector comprises a phase changer for changing the phase of an RF signal from one of the first and second antennas relative to the other of the first and second antennas, a combiner for combining the signal from the phase changer with the signal from the other antenna, and a detector for detecting the signal strength of the signal from the combiner. Some embodiments further comprise control means for controlling the phase changer to change the phase of the RF signal from the antenna.

Some embodiments further comprise recording means for recording a first signal strength from the combiner when the phase changer is in a first state, and wherein the controller is adapted automatically to change the phase of the signal after the first signal strength has been recorded by the recording means, and comparing means for comparing the first signal strength with the signal strength from the combiner after the phase of the signal has been changed.

Thus, in the above embodiments, the apparatus is sensitive to difference in phases between signals received at two different antennas of the antenna means and may use the phase information to determine positional information about an object. The controller may be adapted effectively to vary the look angle of the antenna when used in receive mode. The look angle may be varied by varying the phase relationship between signals in the signal paths from the first and second antennas in order to increase the signal strength from the combiner. Advantageously, in a communication system, this enables the signal-to-noise ratio to be increased, thereby potentially increasing the bandwidth of a communication link between a remote object and the first and second antenna, allowing higher data transfer rates and/or more reliable data transfers.

In some embodiments, positional information about an object may be determined by any suitable means, non-limiting examples of which include optical means, infrared means, any visual characteristic or other signature of the object and/or by prediction. The positional information may be used to control the distribution of RF energy emitted from the antenna assembly.

According to another aspect of the present invention, there is provided an apparatus comprising a plurality of antennas including first and second antennas each adapted for receiving RF signals, at least a portion of said first antenna being disposed at a different vertical position than said second antenna, and detection means coupled to the first and second antennas and adapted to detect the presence of a phase difference between an RF signal received by said first antenna and an RF signal received by said second antenna.

In this arrangement, the apparatus has the ability to detect the presence of a phase difference between the two RF signals received by separate first and second antennas having different vertical positions. The phase difference may be used to determine positional information about an object, for example, the source of RF signals. Means may be provided for decreasing any phase difference in the received signals and combining the signals to improve the signal-to-noise ratio of a communication link between the source of the RF signal and the first and second antennas.

In some embodiments, the detection means comprises a phase changer for changing the phase of an RF signal from one of the first and second antennas relative to the other of the first and second antennas, a combiner for combining the signal from the phase changer with the signal from the other antenna, and a detector for detecting the signal strength of the signal from the combiner.

Some embodiments may further comprise control means for controlling the phase changer to change the phase of the RF signal from the antenna.

Some embodiments further comprise recording means for recording a first signal strength from the combiner when the phase changer is in a first state, and wherein the controller is adapted automatically to change the phase of the signal after the first signal strength has been recorded by the recording means, and comparing means for comparing the first signal strength with the signal strength from the combiner after the phase of the signal has been changed.

In some embodiments, the control means is responsive to the detector to maintain the signal strength of the signal from the combiner at the higher of at least two different levels which are dependent on the phase relationship between the first and second received RF signals.

In some embodiments, the first and second RF signals are emitted from the same location, and the phase relationship between the first and second received RF signals is indicative of positional information about the location. Some embodiments further comprise determining means for determining the positional information about the location based on the phase relationship between the first and second RF signals. The determining means may be adapted to determine positional information about the source of the received first and second RF signals based on one or more other characteristics of the received first and second RF signals.

According to another aspect of the present invention, there is provided a method of emitting RF radiation comprising emitting RF radiation from an antenna means in a first direction in the vertical plane, and subsequently emitting RF radiation from the antenna means in a second, different direction in the vertical plane.

According to another aspect of the present invention, there is provided a method of measuring the position of an object, comprising receiving first and second RF signals from the object by means of first and second antennas, determining a parameter indicative of the phase relationship between the first and second RF signals, and determining the position of the object based on the determined phase relationship.

BRIEF DESCRIPTION OF THE DRAWINGS

Examples of embodiments of the present invention will now be described with reference to the drawings, in which.

DESCRIPTION OF EMBODIMENTS

Figure 1:
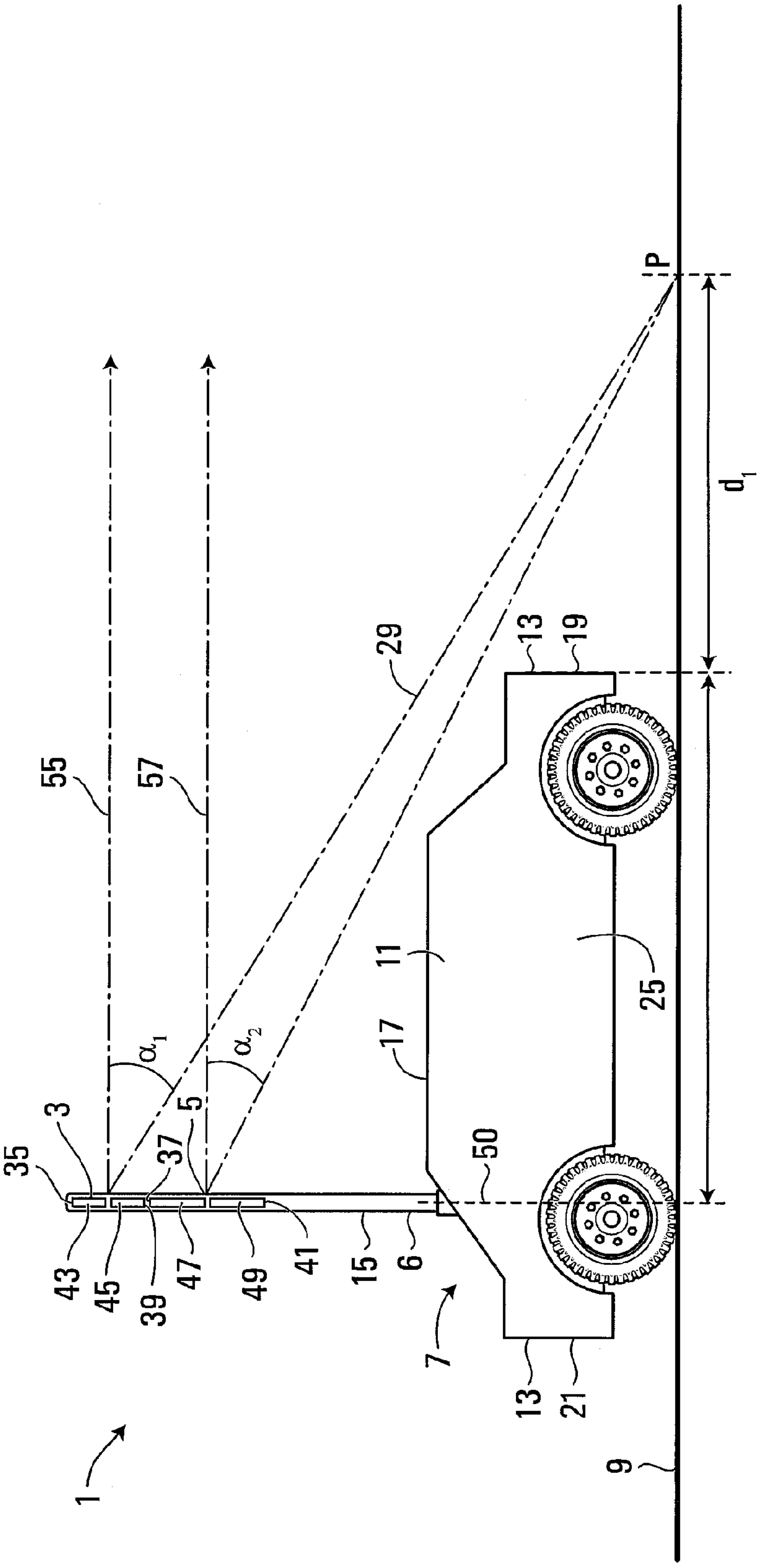
FIG. 1 shows a side view of an antenna assembly according to an embodiment of the present invention.
Figure 2:
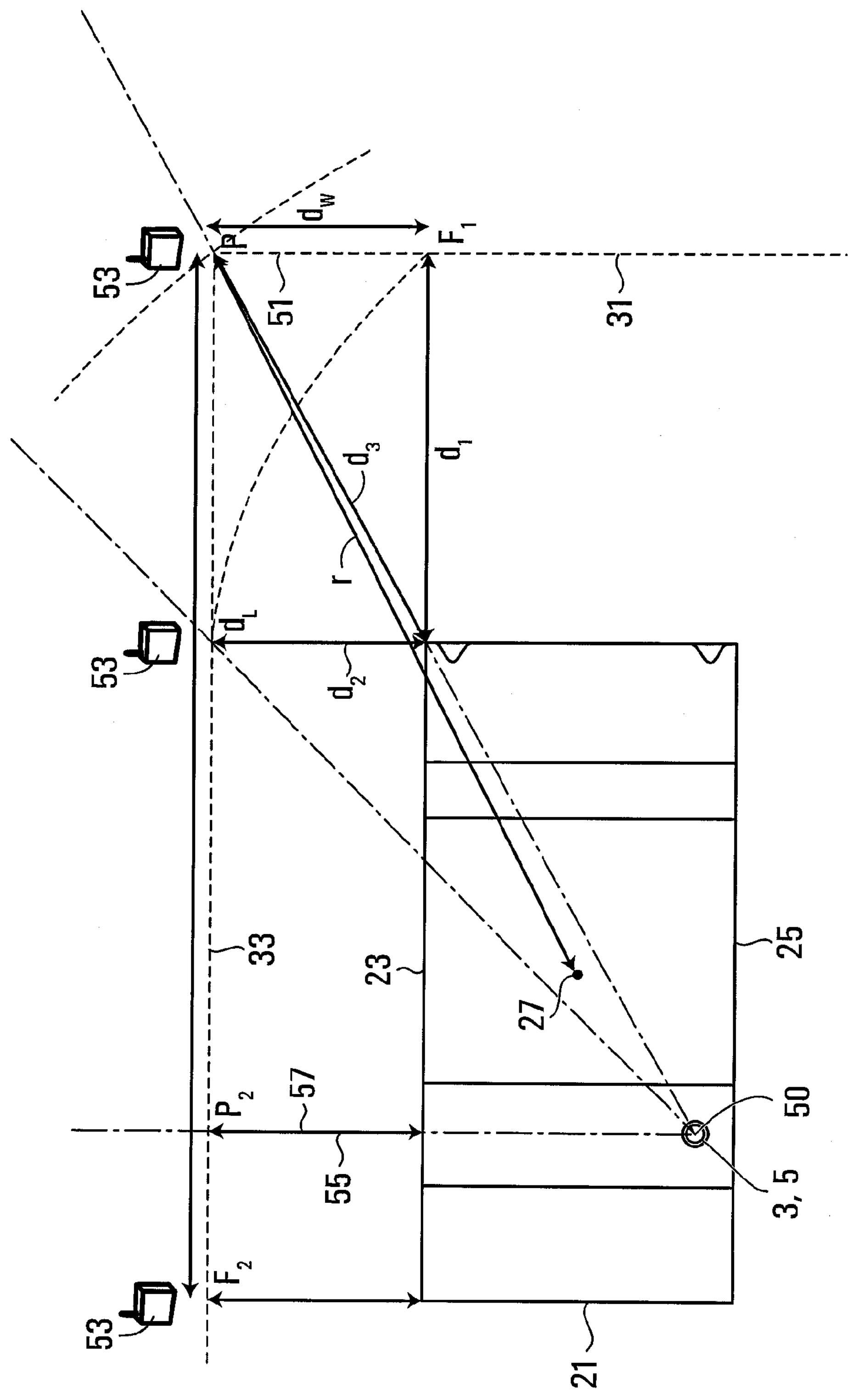
FIG. 2 shows a plan view of the antenna assembly shown in FIG. 1.
Figure 3:
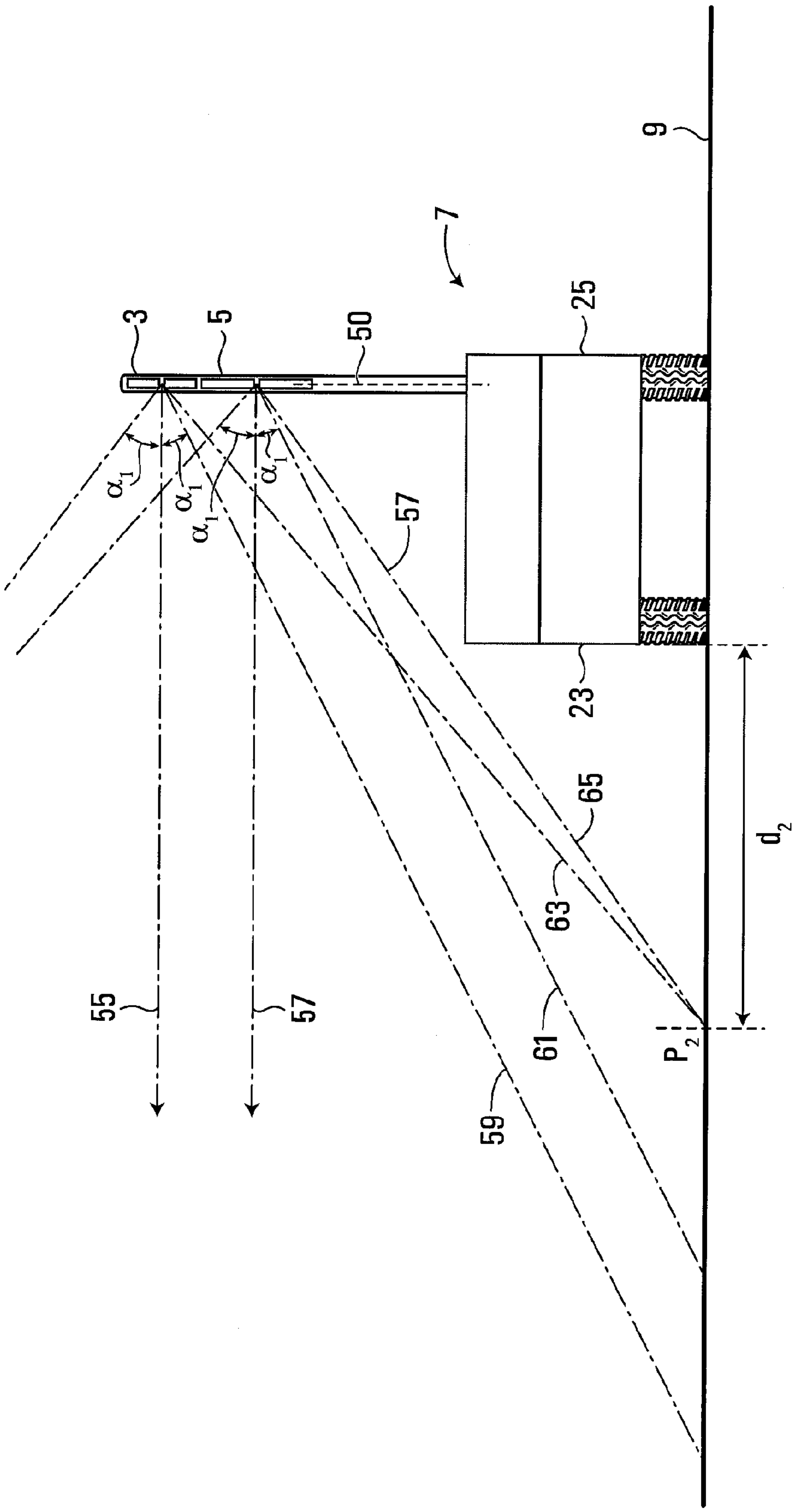
FIG. 3 shows a rear view of the antenna assembly shown in FIGS. 1 and 2.

Referring to FIGS. 1 to 3, an antenna assembly 1 comprises a first antenna 3, a second antenna 5 and a support 6 for supporting the first and second antennas at an elevated position above a surface 9, when mounted on a predetermined support structure 7. In this embodiment, the support structure 7 comprises a mobile structure 11 having a peripheral edge 13. The antenna support comprises an upright member 15 upstanding from the mobile structure 11 for supporting the first and second antennas at a position above the top 17 of the mobile structure. Thus, together, the antenna support 6 and the support structure 7 support the antennas at an elevated position above the surface.

The mobile structure has opposed front and rear ends 19, 21 and opposed left and right sides 23, 25. In this embodiment, the first and second antennas are located at a position which is offset from the center 27 of the mobile support structure 11 towards the rear end 21 and towards the right side 25. In other embodiments, the first and second antennas may be located at any other position on the support structure, for example at the center position 27 or at any other location.

The support 6 is configured to support the first antenna 3 at a sufficient height above the surface 9 to provide a direct path 29 for electromagnetic radiation from at least a portion of the antenna (for example, the mid or main radiating region, or region between elements of a ground plane independent antenna) to a position, P, on the surface 9 spaced from the front end of the support structure (e.g. vehicle) by a distance of less than or equal to $d_1$ and spaced from a side 23 of the support structure by a distance of less than or equal to $d_2$. In some embodiments, the distance $d_1$ has any value in the range of 2.5 to 3 meters. In some embodiments, the distance $d_2$ has any value in the range 2.5 to 3 meters.

In some embodiments, the first antenna 3 is positioned at a sufficient height above the surface 9 to provide a direct path for electromagnetic radiation from at least a portion of the antenna 3 to a position on the surface, external of the peripheral edge 13 of the support structure of less than or equal to a distance $d_3$ from substantially any point on the peripheral edge 13. As can be appreciated from FIG. 2, the distance $d_3$ is the furthest distance from the peripheral edge 13 of the support structure to any point spaced a distance $d_1$ from either end of the mobile support structure and spaced a distance $d_2$ from either side of the support structure as shown by the boundary lines 31 and 33. Distance $d_3$ may be determined as $\sqrt{d_1{}^2+d^2{}_1}$, and may have a value in the range of 3.5 to 4.3 meters, for example. The position P is also the position on the boundary at the surface, where the boundary around the support structure is spaced at a distance $d_1$ from either end of the support structure and a distance $d_2$ from either side of the support structure, for which the direct path from the first antenna 3 to the any point on the boundary is longest.

In this embodiment, the second antenna 5 is also positioned at a sufficient height above the surface 9 to provide a direct path for electromagnetic radiation from at least a portion (e.g. the mid, or main radiating region, or region between elements of a ground plane independent antenna) of the second antenna to the position P, as defined above, and shown in FIG. 2.

Referring to FIGS. 1 and 3, the first and second antennas each have an upper end 35, 37 and a lower end 39, 41. The upper end 37 of the second antenna 5 is positioned below the lower end 39 of the first antenna, and is positioned relatively close or adjacent thereto. In this embodiment, the first antenna comprises a dipole antenna having a pair of dipole elements 43, 45. The second antenna 5 is also a dipole antenna having a pair of dipole elements 47, 49. In this embodiment, the dipole elements of the first and second antennas are substantially coaxially aligned.

In other embodiments, the first and second antennas may comprise any other suitable form of antenna, non-limiting examples of which include any other ground plane independent antenna (e.g. a bicone antenna) or a monopole antenna.

Providing a direct path for electromagnetic radiation emitted from the first antenna 3 to a position on the surface spaced a distance $d_1$ in front of the mobile support structure and spaced a distance $d_2$ from one side of the support structure has been found to significantly improve the signal strength at that position, particularly for relatively high frequencies, in comparison to other arrangements in which only indirect paths for electromagnetic radiation exist between the antenna and that position. Thus, this arrangement significantly mitigates the effects of scattering and shadowing by the support structure. Similar benefits are obtained by providing a direct path between at least a portion of the second antenna 5 and the position.

In some embodiments, a direct line of sight from either one or both of the first and second antennas 3, 5 may be provided over a range of lateral distances $d_w$ positioned at a distance $d_1$ from the front peripheral edge of the support structure from point P (at $d_2$) towards the side (e.g. side 23) of the support structure. The range, for example, may be the range 51 between point P and point $F_1$ which corresponds to a lateral position at the side 23 of the support structure. In other embodiments, the range may be greater or less than the range 51. This arrangement helps to ensure that a continuous region of relatively high signal strength exists across a region in front of and proximate to the support structure, and which extends from a position P to at least the side 23 of the support structure, for example.

In some embodiments, a direct path from one or both of the first and second antennas may be provided over a range of longitudinal distances $d_L$ from point P towards the rear of the support structure spaced a distance $d_2$ from a side 23 of the support structure. The range may extend from point P to at least to a position $F_2$ which corresponds to the rear end 21 of the support structure or beyond the rear end 21.

This arrangement helps to ensure that a continuous region of relatively high signal strength exists along the side of the support structure and which extends at least from the front of the support structure to the rear of the support structure, and which is positioned relatively close to the side of the support structure. This enables a receiver device 53 (which in FIG. 2 is shown in three different positions relative to the mobile structure) to remain continuously in communication with the first and second antennas as the mobile structure approaches and moves past the device. If one or both of the first and second antennas emits a jamming signal, this enables the receiver device 53 to be continuously jammed as the vehicle passes the device. If the device is a remote controlled explosive device, this enables detonation of the device to be reliably prevented.

In some embodiments, the inner edge of the direct line of sight footprint may extend fully around the support structure, so that the inner edge is no more than about 4.5 meters away from the peripheral edge at any position along/around the peripheral edge.

In some embodiments, the antenna assembly may be controlled by a transmitter and/or receiver system described below with reference to FIGS. 18 to 20, for example.

Conventional dipole antennas have an antenna pattern in which the signal intensity is a maximum along a line perpendicular to the dipole axis and decreases as the elevation angle increases from the line towards the dipole axis. Thus, referring to FIG. 3, if the first and second antennas are dipole antennas, radiation lines 55 and 57 perpendicular to the dipole axes 50 represent the line of maximum radiation. At an elevation angle $\alpha_1$ from the maximum intensity lines 55, 57, of typically 40°, the intensity level drops by 3 dB, as indicated by intensity level lines 59, 61 in FIG. 3. In some embodiments, the 3 dB intensity level lines may intercept the surface 9 at a position having a greater distance from the side of the support structure than $d_2$ as indicated by position $P_2$. In this case, the intensity level lines 63 and 65 between position $P_2$ and the respective first and second antennas 3, 5 have a greater angle of elevation than the 3 dB intensity lines and therefore their intensity is lower per unit distance from the antennas than the 3 dB intensity lines. However, as the path length of these lower intensity lines from the antennas to position $P_2$ is shorter than the path length from the 3 dB intensity lines from the antennas to the surface, the shorter path length compensates at least partially for the steeper elevation angle, and the signal intensity at position $P_2$ remains relatively high.

Figure 4:
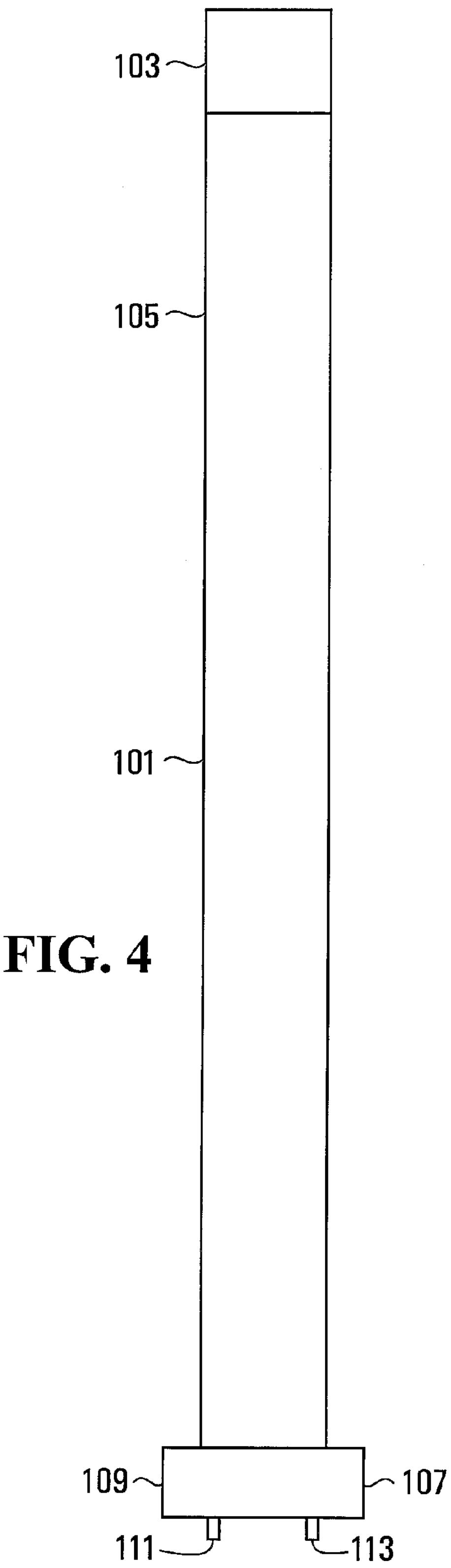
FIG. 4 shows a side view of an antenna assembly according to an embodiment of the present invention.

FIG. 4 shows a schematic diagram of an antenna assembly according to an embodiment of the present invention. In this example, the antenna assembly 101 comprises two antennas 103, 105 in which the first antenna 103 is positioned above the second antenna 105. A mounting structure 107 is provided at the base 109 of the antenna assembly 101 for mounting the antenna assembly to a support structure, e.g. vehicle (not shown). The antenna assembly includes first and second RF ports 111, 113 for passing RF signals to the first and second antennas 103, 105, respectively from an external source.

The antenna assembly includes a support for supporting the first antenna 103 at an elevated position above the base 109. The support may for example be provided at least partially by the second antenna 105, and/or by a housing at least partially enclosing the second antenna, and/or by some other structure upstanding from the base 109.

In this embodiment, each of the first and second antennas 103, 105 are designed to operate efficiently over a limited frequency band, in which the upper operating frequency of the first antenna 103 is above the upper operating frequency of the second antenna 105. The first antenna 103 may be designed to operate at frequencies which are readily scattered by a support structure on which the antenna assembly is or is to be mounted. Locating the first antenna at an upper position of the antenna assembly brings positions on a surface below the support structure having a direct line of sight to the first antenna closer to the support structure, so that RF signals from the antenna are relatively strong at such positions. The height of the first antenna 103 above a surface is the height above the base 109 of the antenna assembly at which the first antenna is supported plus the height of any support structure from the surface to the base 109. The antenna assembly may be configured so that the height of the first antenna 103 above the base 109 provides the desired height of the first antenna 103 above the surface when mounted on a particular support structure, e.g. a mobile structure such as a vehicle, for example, or a static support structure.

In some embodiments, the operating frequency band of the second antenna 105 may be such that the support structure on which the antenna assembly is to be mounted does not significantly scatter or shadow electromagnetic radiation emitted therefrom. At such frequencies, it has been found that the support structure does not significantly interfere with the signal strength at locations proximate the peripheral edge of the support structure. Embodiments of the invention exploit this fact by locating such an antenna at a lower position of the antenna assembly, for example below the upper antenna, thereby making use of the space between the upper antenna and the base of the antenna assembly and not lengthening the antenna assembly unnecessarily. In some embodiments, the second antenna 105 may be located so that there is no or no substantial direct line of sight between the antenna and a position on the surface spaced from the support structure where the RF signal strength emitted from the second antenna should be relatively high.

The upper operating frequency limit of the second antenna 105 may either be above, adjacent or below the lower operating frequency limit of the first antenna 103. The first antenna 103 may be any suitable antenna for emitting relatively high frequencies such as a dipole, bicone or other ground plane independent antenna, and the second antenna 105 may be any suitable antenna for operating at relatively low frequencies, such as a dipole or monopole antenna.

Figure 5:
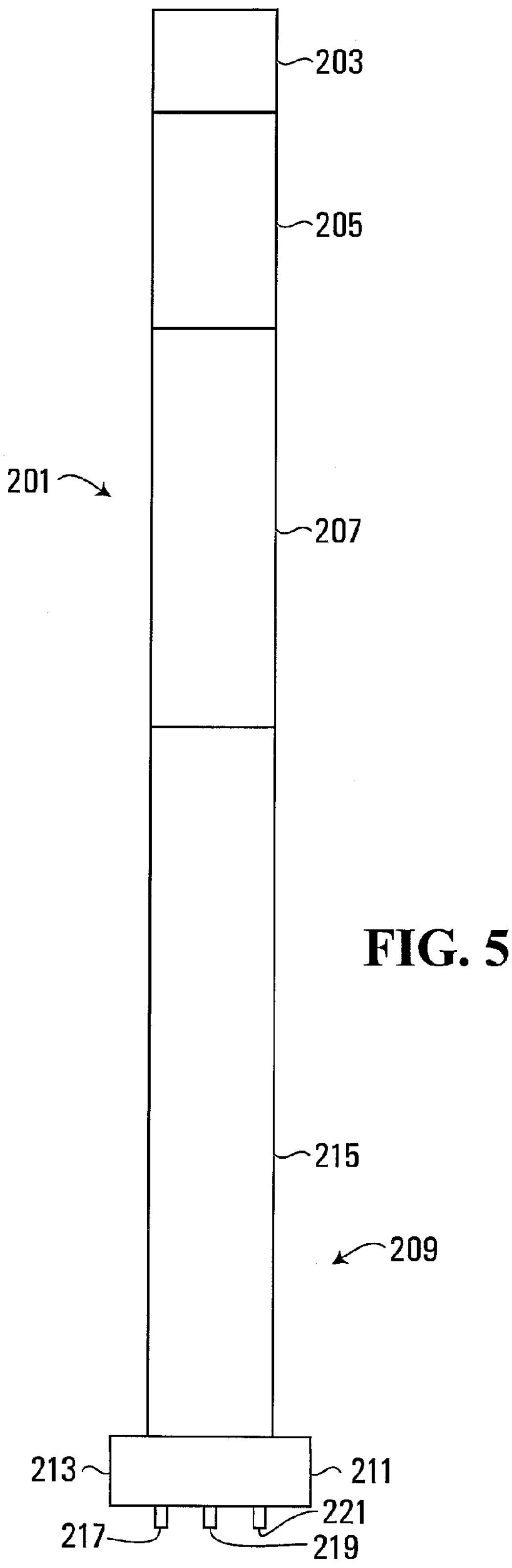
FIG. 5 shows a side view of an antenna assembly according to an embodiment of the present invention.

FIG. 5 shows another example of an antenna assembly according to an embodiment of the present invention. The antenna assembly 201 comprises three antennas 203, 205, 207 and an antenna support 209 which includes a mounting structure 211 at the base 213 of the antenna assembly and a support section 215 upstanding from the mounting structure 211. Three RF ports 217, 219, 221 are provided for passing RF signals to the respective first, second and third antennas 203, 205, 207.

In this embodiment, the second antenna 205 is positioned above the third antenna 207 and the first antenna 203 is positioned above the second antenna 205. Each of the antennas operates efficiently over a limited frequency band, and in some embodiments, the upper operating frequency limit of the second antenna 205 is below the upper operating frequency limit of the first antenna, and/or the upper operating frequency limit of the third antenna 207 is below the upper operating frequency limit of the second antenna 205. In this arrangement, each of the antennas is positioned at an elevational level of the antenna assembly which increases with the operational frequency band of the antenna. Thus, the first antenna 203 which operates at the highest frequency band is the uppermost antenna, the second antenna 205 which operates at the second highest frequency is positioned below the first antenna 203 and the third antenna 207 which operates at the lowest frequency band is positioned below the second antenna 205.

The lower antenna 207 is supported by the support section 215. The second antenna 205 may be supported at least partially by the third antenna 207, and/or by a housing at least partially enclosing the third antenna 207 or by some other support structure. The first antenna 203 may be supported at least partially by the second antenna 205, by a housing of the antenna assembly at least partially enclosing the second antenna or by some other support structure.

The operating frequency band of the first antenna 203 may be such that electromagnetic radiation within the frequency band is significantly scattered by a support structure on which the antenna assembly 201 is or is to be mounted. The antenna assembly is configured so that the height of the first antenna 203, when mounted on the support structure, is at a sufficient height above the surface on which the support structure is located to provide a direct line of sight between the first antenna and a position on the surface spaced a predetermined distance from the peripheral edge of the support structure, where sufficient signal strength from the first antenna is critical.

In some embodiments, the second and/or third antenna 205, 207 may operate at frequencies which are also significantly scattered by the support structure to which the antenna assembly is or is to be mounted, and the antenna assembly is configured so that the second and/or third antenna is positioned at a sufficient height above the surface when mounted to the support structure to provide a direct line of sight between the respective antenna and a critical position on the surface spaced from the peripheral edge of the support structure. In a specific embodiment, the second antenna 205 is positioned at a sufficient height to provide a direct line of sight to the critical position on the surface, but the third antenna 207 operates at frequencies at which the electromagnetic radiation is not significantly scattered by the support structure, and is positioned at a height where there is no or substantially no direct line of sight from the third antenna to the critical position on the surface.

In some embodiments, the first and second antennas 203, 205 may be designed to operate at relatively high frequencies, and may for example comprise a bicone or dipole antenna. The third antenna 207 may be designed to operate at intermediate frequencies and may comprise any of a bicone, dipole or monopole antenna or any other form of antenna.

In some embodiments, the antenna assemblies shown in FIGS. 4 and 5 and described above may form a set of antennas intended to be used together and mounted on the same support structure. The operational frequency band of one or more antennas may be different from the operational frequency band of one or more other antennas of the set. In some embodiments, the operational frequency band of two or more antennas may be substantially the same. In a specific embodiment, the operational frequency band of each antenna is different from any other antenna of the set. For example, the operational frequency band of the first antenna 103 of the antenna assembly 101 of FIG. 4 may be the highest, the frequency band of the second antenna 105 of the first antenna assembly 101 may be the lowest and each of the frequency bands of the first, second and third antennas 203, 205, 207 of the second antenna assembly 201 may be between the highest and lowest operating frequency bands of the first and second antennas 103, 105 of the first antenna assembly. One or more of the operational frequency bands may be adjacent another or at least partially overlap so that the antenna set is collectively capable of efficiently emitting RF signals over a substantially continuous, broad frequency range. In other embodiments, the operating frequency bands of the antennas may be selected to provide a gap between one or more frequency bands. Such a configuration may be implemented where it is not necessary or desirable for the antennas to emit over a specific range of frequencies, for example.

In some embodiments, one or more of the antennas of the antenna assemblies 101, 201 of the FIGS. 4 and 5 are arranged to emit radiation over the full azimuthal range, i.e. over 360°.

In some embodiments, the antennas of an antenna assembly may be positioned so that the upper end of one antenna is at an elevational level which is either at, below or above the lower end of an upper antenna. Thus, in some embodiments, the elevational position of two or more antennas may or may not overlap. In the former case, the lateral dimension of overlapping antennas may be such that each antenna does not interfere with the propagation of electromagnetic radiation emitted from another antenna at the wavelength(s) concerned. In some embodiments, one or more antennas may be arranged to capacitively couple with another, e.g. adjacent, antenna to control the direction of RF radiation, as more fully described below.

Figure 6:
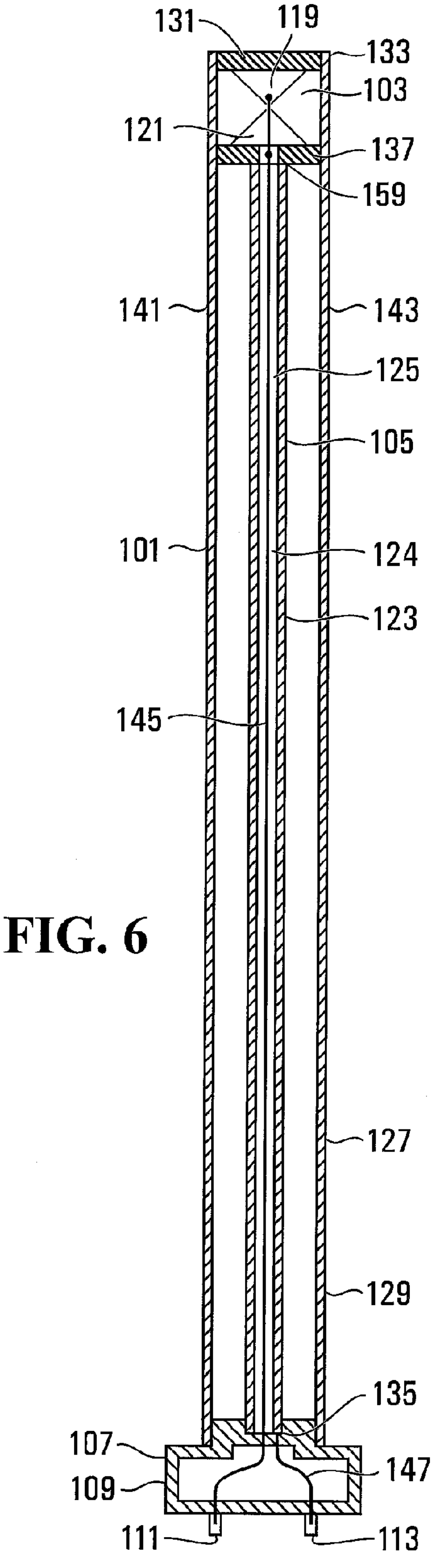
FIG. 6 shows a cross-sectional view through an antenna assembly according to an embodiment of the present invention.

A specific example of the antenna assembly of FIG. 4 is shown in more detail and in cross-section in FIG. 6. In this embodiment, the first antenna 103 is a bicone antenna and the second antenna 105 is a monopole antenna. The bicone antenna 103 comprises opposed upper and lower cones 119, 121. The monopole antenna 105 comprises a single hollow tubular element 123 defining an internal conduit 125. The antenna assembly includes a housing 127 which at least partially encloses the first and second antennas 103, 105, and in this embodiment comprises a hollow tube having a cylindrical wall 129 extending upwardly from the base 109 of the assembly, and an optional top or cover 131 adjacent the upper end 133 of the housing. The cylindrical wall 129 of the housing comprises a suitable dielectric material which is substantially transparent to the electromagnetic radiation in the frequency band(s) of the antennas. In this embodiment, the lower end 135 of the antenna element 123 is supported by and extends upwardly from the base 109. A spacer element 137 is positioned between the first and second antennas 103, 105, and in this embodiment is positioned adjacent the upper end 139 of the second antenna and the bottom of the lower cone 121. The spacer 137 may be adapted to resist or prevent relative lateral movement between the antenna element 123 and the housing 127. For example, as shown in FIG. 6, the spacer extends between opposed wall portions 141, 143 of the housing 127 to prevent lateral movement between the spacer and the housing, and an upper end portion of the antenna element 123 may engage with the spacer 137 to substantially prevent lateral movement between the spacer and the antenna element. Alternatively, one or more other spacer elements may be provided, for example at other positions between the upper and lower ends of the antenna element 123 to resist or prevent lateral movement between the antenna element and the housing.

In this embodiment, the spacer element 137 supports the first antenna 103. The first antenna 103 and the spacer element 137 may be supported by the second antenna only (for example if the spacer element is free to slide up and down relative to the antenna housing), by only the antenna housing 127 (for example if the spacer element 137 is not free to move up and down relative to the housing), or by a combination of both the antenna element 123 and the housing.

The first RF port 111 is connected to one of (e.g. the upper) conical elements 119, 121, of the bicone antenna via a suitable RF lead 145, which may conveniently pass through the inner conduit 124 of the second antenna element 123, as shown in FIG. 6. In other embodiments, the RF lead may pass externally of the second antenna element. The second RF port 113 is electrically connected to the second antenna element 123 via a suitable RF lead 147.

Figure 7:
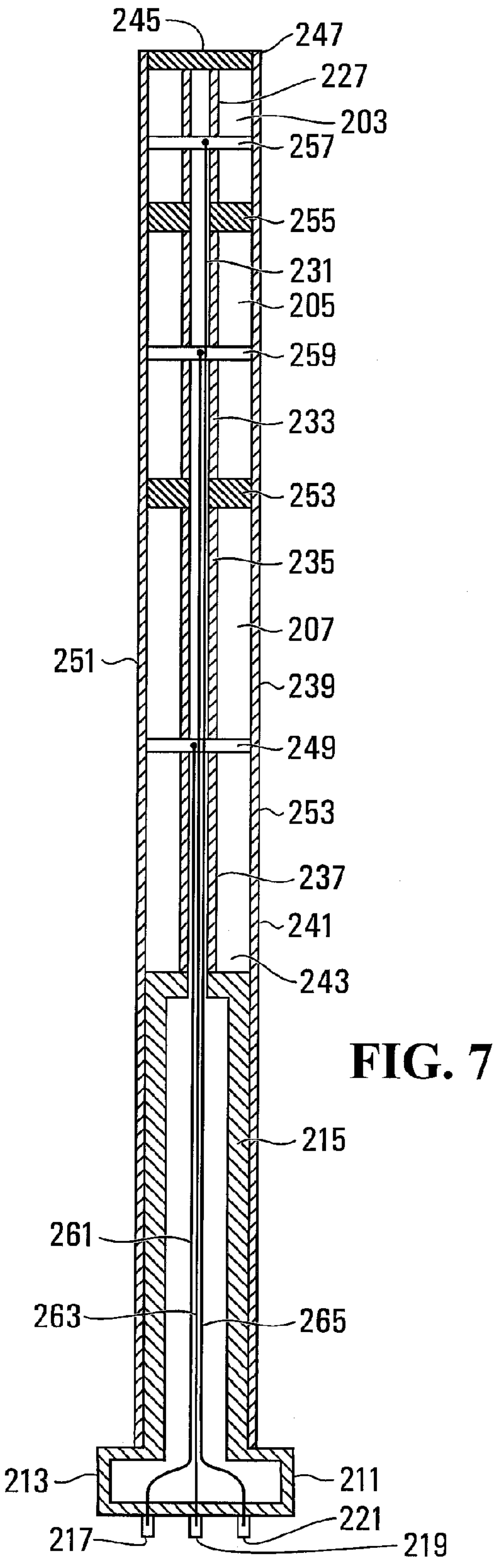
FIG. 7 shows a cross-sectional view through an antenna assembly according to an embodiment of the present invention.

An example of the embodiment of the antenna assembly illustrated in FIG. 5 is shown in more detail in FIG. 7. In this embodiment, each of the first, second and third antennas 203, 205, 207 comprises a dipole antenna in which the first antenna 203 comprises upper and lower dipole elements 227, 229, the second antenna 205 comprises upper and lower dipole elements 231, 233 and the third antenna 207 comprises upper and lower dipole elements 235, 237. In this embodiment, each of the dipole elements has the form of a hollow tube having cylindrical walls defining an inner, longitudinal conduit therethrough. Each dipole antenna may be a quarter- or half-wave length antenna.

The antenna assembly further comprises a housing 239 which at least partially encloses the first, second and third antennas 203, 205, 207 and which, in this embodiment, comprises an outwardly extending cylindrical wall 241 defining an internal space 243 for accommodating the antennas and an optional top or cover 245 positioned adjacent the upper end 247 of the housing. The housing assembly includes a support section 215 extending upwardly from the base 213 which supports the lower antenna 207. A spacer element 249 separates the first and second dipole elements of the lower antenna 207 and optionally extends between opposed wall sections 251, 253 of the housing. A spacer element 253 separates the second and third antennas and spaces the antennas apart in the vertical direction. Similarly, a spacer 255 is positioned between the first and second antennas 203, 205 to separate the antennas from one another and which also spaces the antennas apart in the vertical direction. An additional spacer element 257, 259 is provided between respective dipole elements of the first and second antennas to separate the dipole elements of the same antenna, and which may optionally extend between opposed wall sections 251, 253 of the housing. Each of the spacer elements 253, 255 between the antennas may have any of the features described above in connection with the spacer element 137 of the antenna assembly 101 shown in FIG. 6.

The first RF port 217 is connected to the first antenna 203 via a suitable RF lead 261, the second RF port 219 is connected to the second antenna 205 via a suitable RF lead 263 and the third RF port 221 is connected to the third antenna 203 via a suitable RF lead 265. One or more of the RF leads may conveniently pass through the internal conduit defined through the tubular dipole elements of the antennas, for example as shown in FIG. 7, and may pass through the interior of the support section 215. However, in other embodiments, the RF leads may be positioned externally of the support section 215 and/or one or more antenna elements 203, 205, 207.

Figure 8:
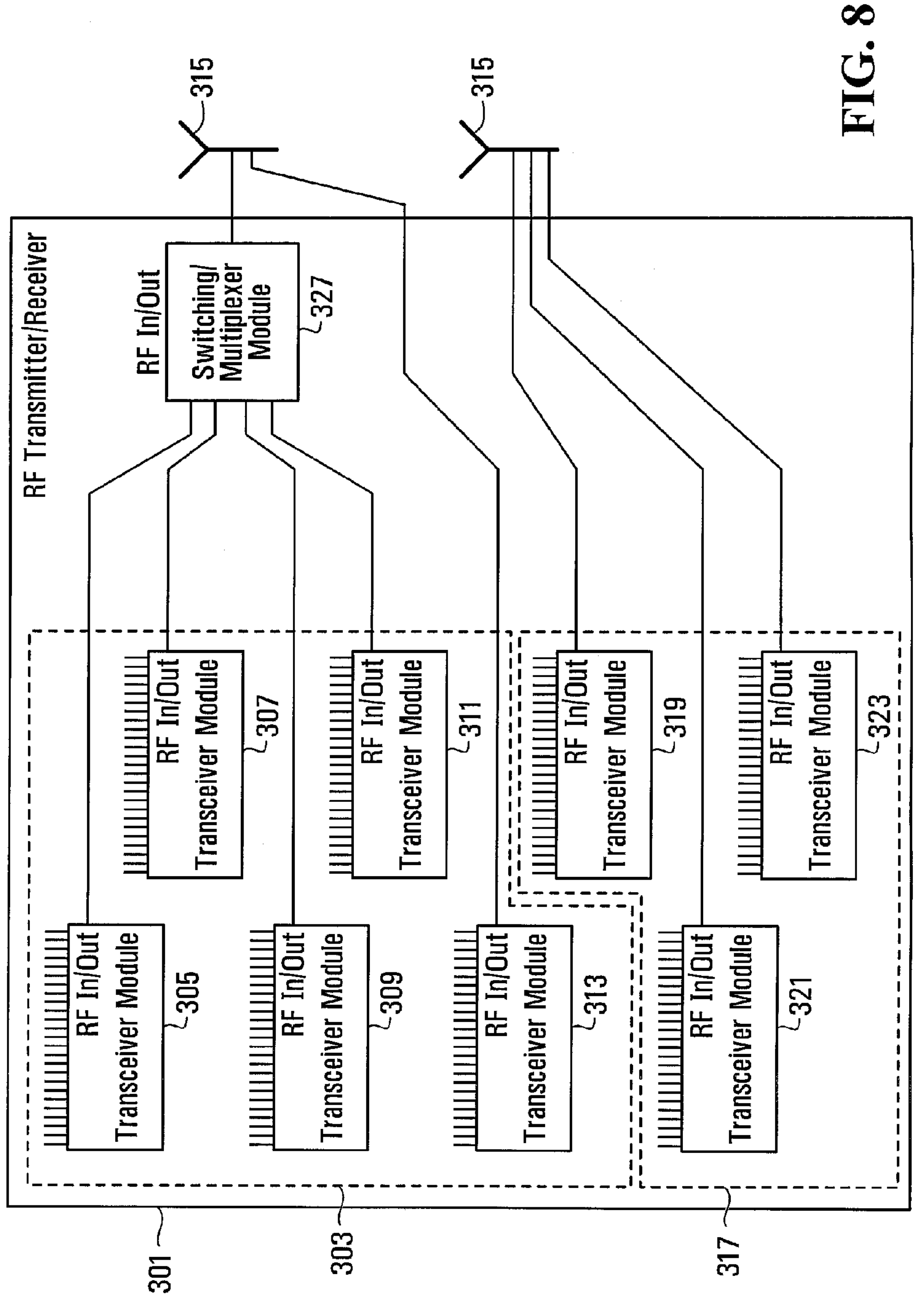
FIG. 8 shows a schematic diagram of a configuration of radio transmitter modules and antenna assemblies according to an embodiment of the present invention.

FIG. 8 shows a schematic block diagram of an embodiment of an RF transmitter/receiver for use with embodiments of the antenna assembly. The RF transmitter/receiver 301 comprises a first group 303 of transceiver modules 305, 307, 309, 311, 313 for providing RF signals to a first antenna assembly 315 and a second group 317 of transceiver modules 319, 321, 323 for providing RF signals to a second antenna assembly 325. In this example, the first antenna assembly 315 has first and second antennas, one of which is a high frequency band antenna and the other is a low frequency band antenna. The antenna assembly 315 may, for example, be similar to that described above in conjunction with FIGS. 4 and 6. In this example, the second antenna assembly 325 comprises three antennas each of which may have a low or mid-frequency operating band. The second antenna assembly 325 may be similar to that described above with reference to FIGS. 5 and 7, for example. The transceiver modules may be specifically configured to operate within a predetermined limited frequency band. Two or more transceiver modules may be connectable to the same antenna, for example so that the antenna either receives RF signals from only one RF transceiver module at any one time or receives RF signals simultaneously from two or more transceiver modules. In the specific example of FIG. 8, four transceiver modules 305, 307, 309, 311 are connectable to the first antenna of the antenna assembly 315 via a switching module (or multiplexer) 327. The switching/multiplexer module may be configured to connect only one transceiver module to the antenna at any one time and/or be capable of connecting two or more transceiver modules to the antenna simultaneously. In this embodiment, one transceiver module 313 of the first group is connected to the second antenna of the first antenna assembly 315. In this embodiment, each transceiver module 319, 321, 323 of the second group 317 is connected to the respective first, second and third antennas of the second antenna assembly 325.

As mentioned above, each transceiver module may be adapted to operate over a specific frequency band. Two or more modules connectable to the same antenna may be configured to operate over the same frequency band. One or more frequency bands may be divided into two or more sub bands and two or more modules connectable to the same antenna may be configured to operate within the same frequency band but different sub-bands thereof. In a specific, non-limiting example, each of transceiver modules 307, 309 and 311 are configured to operate within a mid-frequency band and each module is adapted to operate within a different sub-frequency band of the mid-band. Transceiver module 305 of the first group 303 may be configured to operate within a high frequency band, for example, and transceiver module 313 may be adapted to operate over a low frequency band, and possibly over a sub band within a low frequency band. Each of the transceiver modules 319, 321, 323 of the second group 317 may be configured to operate within a low frequency band and each may operate within a different sub-band of the low frequency band. Each low frequency sub-band of the second group of transceiver modules may be different from the low frequency sub-band of the transceiver module 313 of the first group. In other embodiments, any other configuration of receiver modules is possible. Although the switching/multiplexer module in the embodiment of FIG. 8 is adapted to switch/couple different transceiver modules to the same antenna, in other embodiments, a switching/multiplexer module may be provided to switch/couple the same transceiver module to different antennas.

In some embodiments, two or more different operating frequency bands of two or more modules may be substantially adjacent one another so that the transceiver modules together cover a continuous spectrum of frequencies between the lower frequency band and the upper frequency of the upper frequency band.

Although in some embodiments, one or more antennas of the antenna assembly may comprise a broadband antenna, each antenna may beneficially comprise a relatively narrow band antenna tuned to operate over a specific limited frequency band to provide increased antenna gain and coverage performance.

In other embodiments, the RF system connected to an antenna assembly may comprise one or more transmitter modules adapted only for transmitting RF signals, or one or more receiver modules configured only for receiving RF signals from the antenna assembly or one or more transceiver modules capable of both transmitting and receiving RF signals to and from an antenna assembly. In some embodiments, two or more modules may be switchably coupled to a single antenna of an antenna assembly or a single module may be switchably coupled between different antennas of the same antenna assembly or between different antennas of different antenna assemblies.

According to another aspect of the present invention, an antenna assembly is provided having at least one antenna in which the direction of radiation emitted from the antenna is biased in a downward direction so that there is a higher concentration of electromagnetic radiation below the horizon than above the horizon. In some embodiments, means may be provided for concentrating the electromagnetic radiation in a narrower elevational band. Examples of embodiments of this aspect of the invention are described below with reference to FIGS. 9 to 12.

Figure 9:
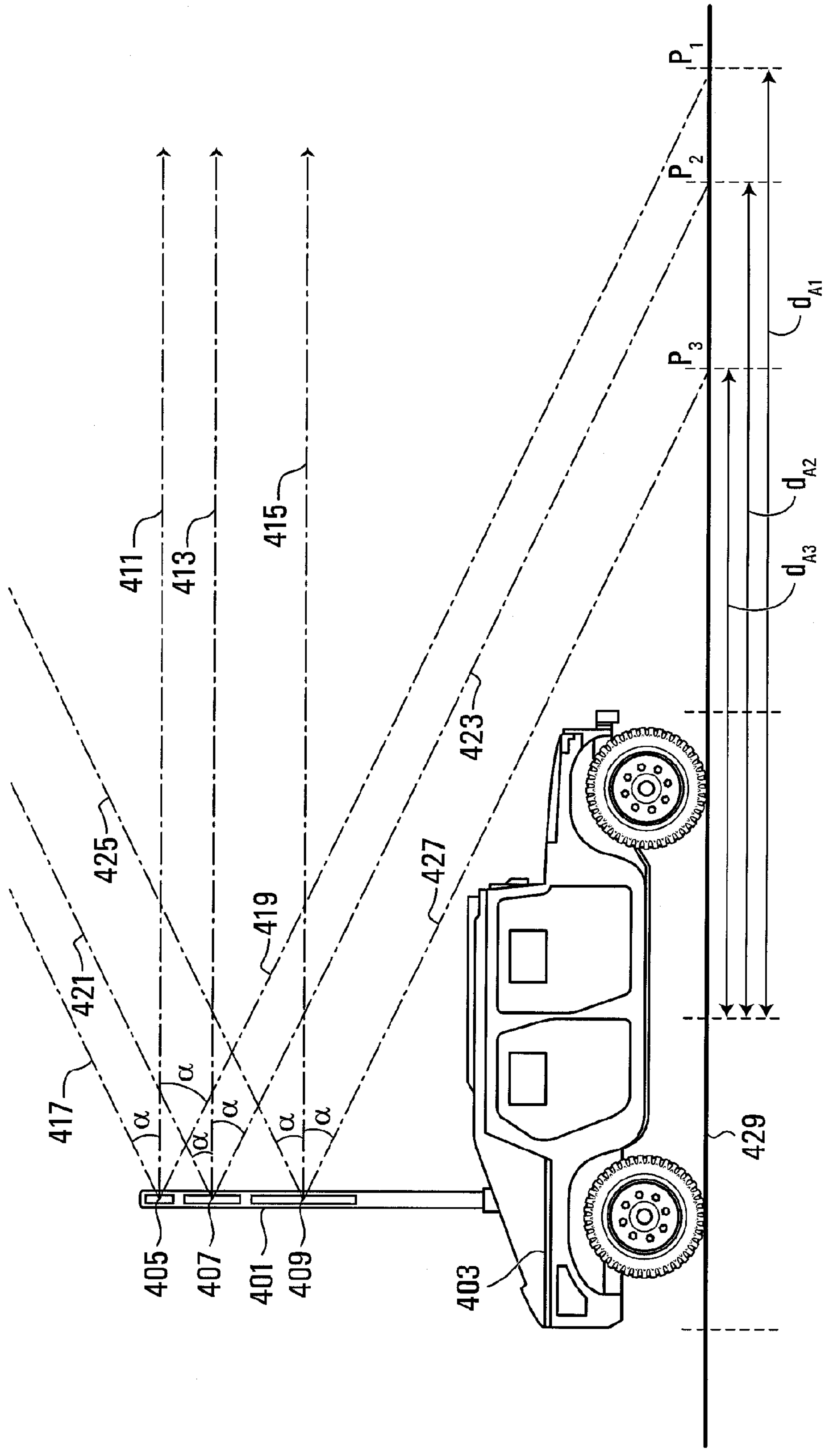
FIG. 9 shows a side view of an antenna assembly according to an embodiment of the present invention.

FIG. 9 shows an example of an antenna assembly 401 mounted on a mobile support structure 403. The antenna assembly comprises three antennas 405, 407, 409 arranged in a stacked formation. In operation, each antenna radiates electromagnetic radiation with the direction of maximum radiation intensity being perpendicular to the antenna axis, as shown by the horizontal intensity lines 411, 413, 415. As illustrated, each antenna radiates radiation both above and below the respective horizontal line 411, 413, 415 of maximum intensity, and in this embodiment, the distribution of electromagnetic radiation with angle of elevation is symmetrical above and below the respective line of maximum radiation. The intensity of radiation decreases as the angle of elevation increases towards the antenna longitudinal axis and radiation lines 417, 419 illustrate the direction of electromagnetic radiation emitted from the first antenna 405 at which the intensity is reduced by a predetermined value, e.g. 3 dB from the maximum value. For a dipole antenna, the angle of elevation $\alpha$ at which the intensity of radiation has decreased by 3 dB is typically about 40°. Similarly, lines 421 and 423 illustrate the direction of radiation of the second antenna 407 for which the intensity of radiation is decreased by a predetermined value, e.g. 3 dB, and lines 425 and 427 show the direction of radiation from the third antenna 409 for which the intensity of radiation has decreased by a predetermined value, e.g. 3 dB. The downwardly directed, reduced intensity lines 419, 423, 427 from the first, second and third antennas, respectively, intercept the surface 429, above which the support structure is positioned, at points P1, P2, P3 spaced from the front of the support structure by distances $d_{A1}$, $d_{A2}$ and $d_{A3}$, respectively.

Figure 10:
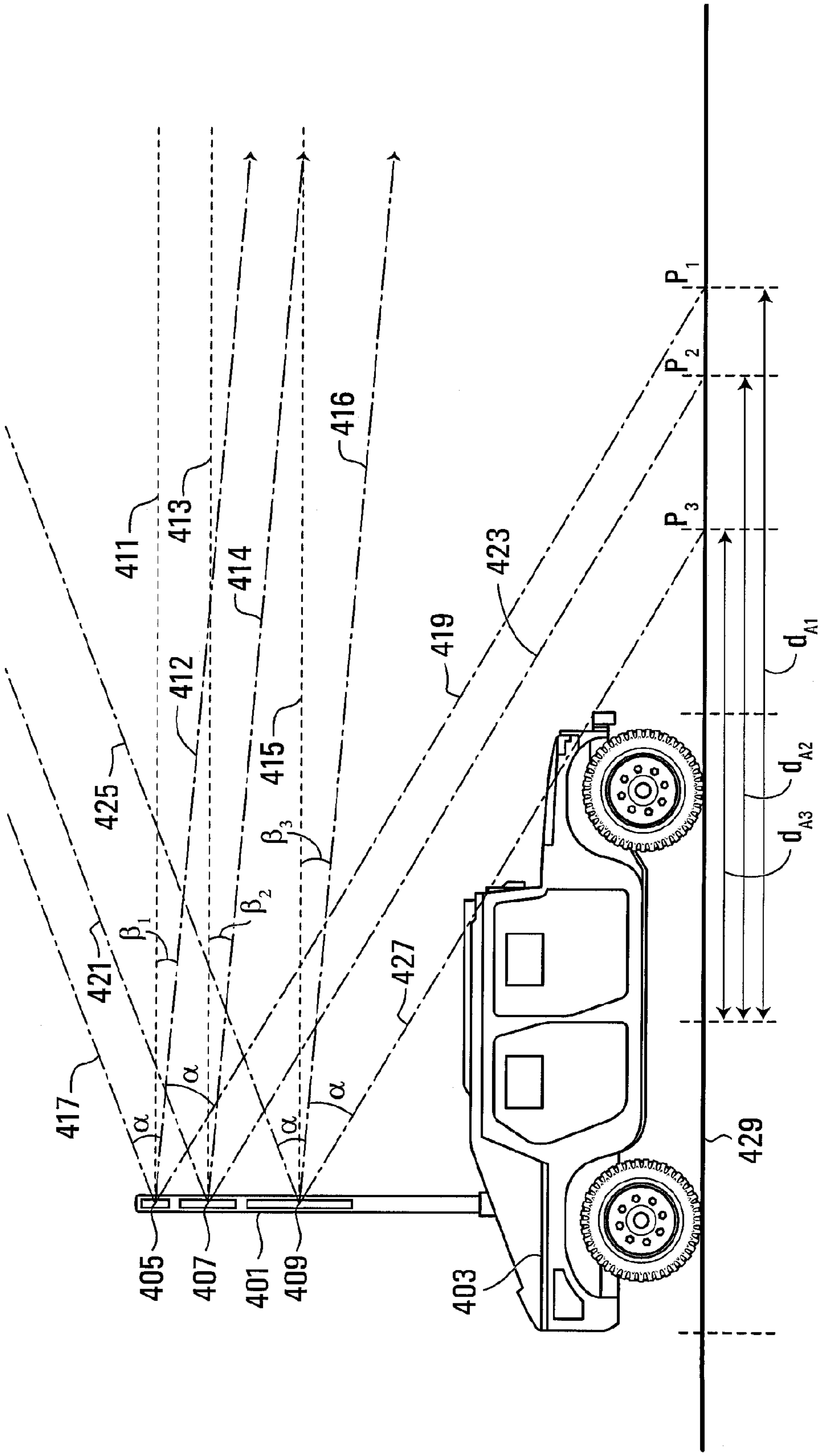
FIG. 10 shows a side view of an antenna assembly according to an embodiment of the present invention.

FIG. 10 shows a modification of the arrangement shown in FIG. 9 in which the electromagnetic radiation emitted from each antenna is biased in a downward direction. Thus, as illustrated in FIG. 10, the direction 412 of maximum radiation intensity from the first antenna 405 is at a negative elevational angle $\beta_1$ relative to the horizontal direction 411, the direction 414 of maximum radiation intensity from the second antenna 407 is at a negative elevational angle $\beta_2$ relative to the horizontal line 413 and the direction 416 of maximum radiation intensity from the third antenna 409 is at a negative elevational angle $\beta_3$ relative to the horizontal line 415. In this particular example, angles $\beta_1$, $\beta_2$ and $\beta_3$ each have the same value, although in other embodiments, the elevational angle of maximum intensity of one antenna may be different from that of another antenna.

In this embodiment, each of the predetermined reduced intensity lines 417, 421, 425 above the respective line of maximum intensity and reduced intensity lines 419, 423, 427 below the respective line of maximum intensity are at the same elevational angle, $\alpha$, relative to the respective line of maximum intensity. Thus, with respect to the arrangement of FIG. 9, the angle subtending the reduced intensity lines of an antenna is the same and the only change is the direction of the radiation distribution from each antenna, which in FIG. 10 is, on average, in a downward direction.

As can be seen in FIG. 10, the positions P1, P2, P3 at which the downwardly directed reduced intensity lines 419, 423, 427 intercept the surface 429 are closer to the support structure 403 than in FIG. 9. The reduced intensity lines also have a direct line of sight to the surface from each antenna. Thus, by downwardly directing radiation from one or more antennas, the radiation intensity at the surface near the support structure can be considerably increased.

Each antenna may radiate over a full range of azimuthal angles or at least a range which includes one or both sides of the support structure and the distribution of radiation emitted from the antenna is directed downwardly over either the full range of azimuthal angles or a partial range which includes one or both sides of the vehicle. It can be appreciated that, with this arrangement, the intensity of radiation emitted from the antenna assembly near one or both sides of the vehicle can be considerably increased.

Figure 11:
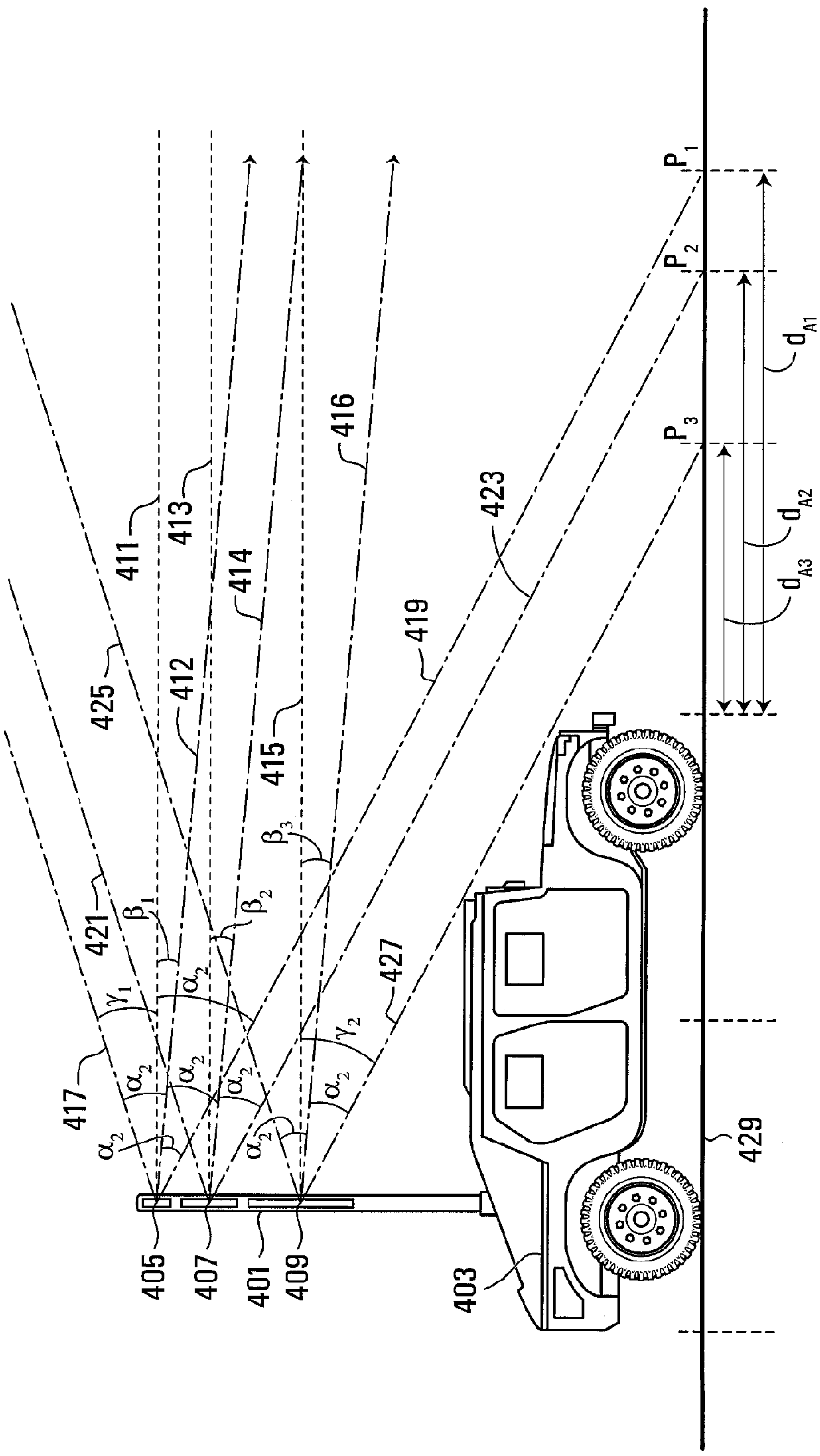
FIG. 11 shows a side view of an antenna assembly according to an embodiment of the present invention.

FIG. 11 shows another arrangement which is a modification of that shown in FIG. 10. In FIG. 11, the radiation distribution from each of the first, second and third antennas 405, 407, 409 is angled downwardly at an angle $\beta_1$, $\beta_2$, $\beta_3$ with respective to the horizontal, the difference being that the elevational spread of radiation is more concentrated than that of FIG. 10, so that the lines of reduced intensity 417, 421, 425, 419, 423, 427 are at a reduced angle $\alpha_2$ relative to the respective line 412, 414, 416 of maximum intensity in comparison to the angle $\alpha$ of the arrangement of FIG. 10.

The combination of both tilting the angular distribution of electromagnetic radiation downwardly and concentrating the angular distribution within a narrower range of angles increases the intensity of radiation at locations at or near the surface on which the antenna assembly is placed. Depending on the tilt angle, this arrangement may also increase the intensity of radiation at positions closer to the antenna assembly support structure. For example, referring to FIG. 11, the tilt angle $\beta_1$ of the first antenna 405 may need to be increased to compensate for the reduced angle $\alpha_2$ between the line of maximum intensity 412 and the lower line of reduced intensity 419 resulting from a more concentrated distribution of radiation, to maintain the position P1 at which the lower intensity line 419 intercepts the surface close to the support structure.

In some embodiments, the angle subtending the upper and lower lines of reduced intensity is about 45°, with the elevational angle $\gamma$1 between the horizontal and upper reduced intensity line being about 15° and the angle $\gamma_2$ between the horizontal 411 and the lower reduced intensity line 419 being about −30°.

Figure 12:
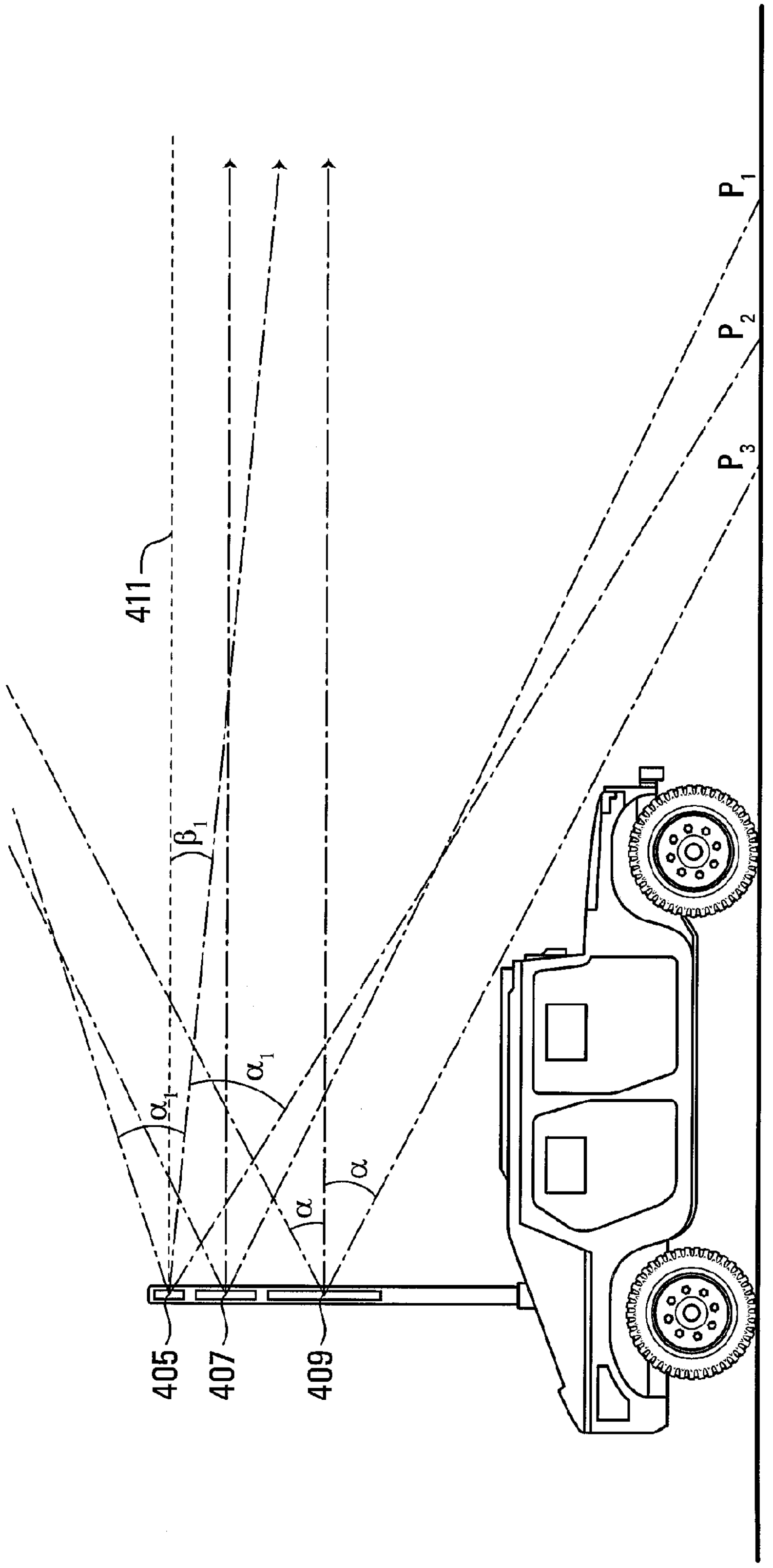
FIG. 12 shows a side view of an antenna assembly according to an embodiment of the present invention.

FIG. 12 illustrates another arrangement showing distributions of electromagnetic radiation from an antenna assembly having three antennas. In this arrangement, the radiation distribution from the first antenna 405 is tilted downwardly by an angle $\beta_1$ relative to the horizontal 411, the radiation distribution from the second antenna 407 is directed substantially horizontally but the elevational spread of radiation is more concentrated, and the radiation distribution from the third antenna 409 is both directed horizontally and has a standard elevational spread without concentration. The inventors have found that these radiation distributions from the antennas can be produced with the second antenna 407 radiating with electromagnetic radiation frequencies above those radiated by the third antenna 409 and below the RF frequencies radiated by the first antenna 405. In a particular embodiment, the inventors have found that relatively high frequency radiation from the first antenna 405 is affected by the radiation radiated by and/or the presence of both the second and third antennas 407, 409 to produce a downward tilt, that the radiation emitted by the second antenna 407 is affected by the radiation emitted by and/or the presence of the first and third antennas 405, 409 to produce a distribution with increased directivity and concentration and that the radiation distribution emitted by the third antenna 409 is substantially unaffected by the radiation emitted from and/or the presence of the first and second antennas.

In the arrangement of FIG. 12, the lower dipole element of the first antenna 405 couples to the second (and third) antenna 407 more than the upper dipole element of the first antenna, effectively extending the electrical length of the lower element relative to the upper element. This asymmetry tends to bias the emitted radiation downwardly.

The upper element of the second antenna 407 couples to the first antenna and the lower element couples to the third antenna 409. However, due to the longer length of the third antenna relative to the first, the lower element of the second antenna couples more strongly to the third antenna than the upper element does to the first antenna. In some embodiments, this may effectively increase the electrical length of the lower element relative to the upper element, thereby biasing the radiation from the second antenna downwardly.

In any of the embodiments described herein, the direction of radiation from an antenna can be controlled by controlling the relative phase of RF signals between the antenna and another adjacent antenna, for example in an arrangement where the antennas are positioned one above the other. The elevational distribution of electromagnetic radiation from an antenna may be controlled in a similar manner. Some embodiments may include a phase controller for controlling the relative phase of signals passed to two or more antennas. For example, one or more phase controllers may be included in the RF transmitter/receiver of the embodiment of FIG. 8. The phase controller(s) may be included with the switch/multiplex module or separately, for instance. In other embodiments, RF signals to any of the antenna assemblies disclosed herein may be provided by an apparatus described below, for example, with reference to FIG. 18, 19 or 20. Alternatively, or in addition, the direction and/or distribution can be controlled by controlling the relative frequency (and/or amplitude) of radiation emitted by the antenna and that emitted by one or more adjacent antennas. Alternatively, or in addition, the antenna or an antenna array may be structured to provide the required direction of emitted radiation and elevational distribution. Examples of antenna structures capable of biasing the direction of radiation downwardly are described below with reference to FIGS. 16A to 16C.

Figure 13:
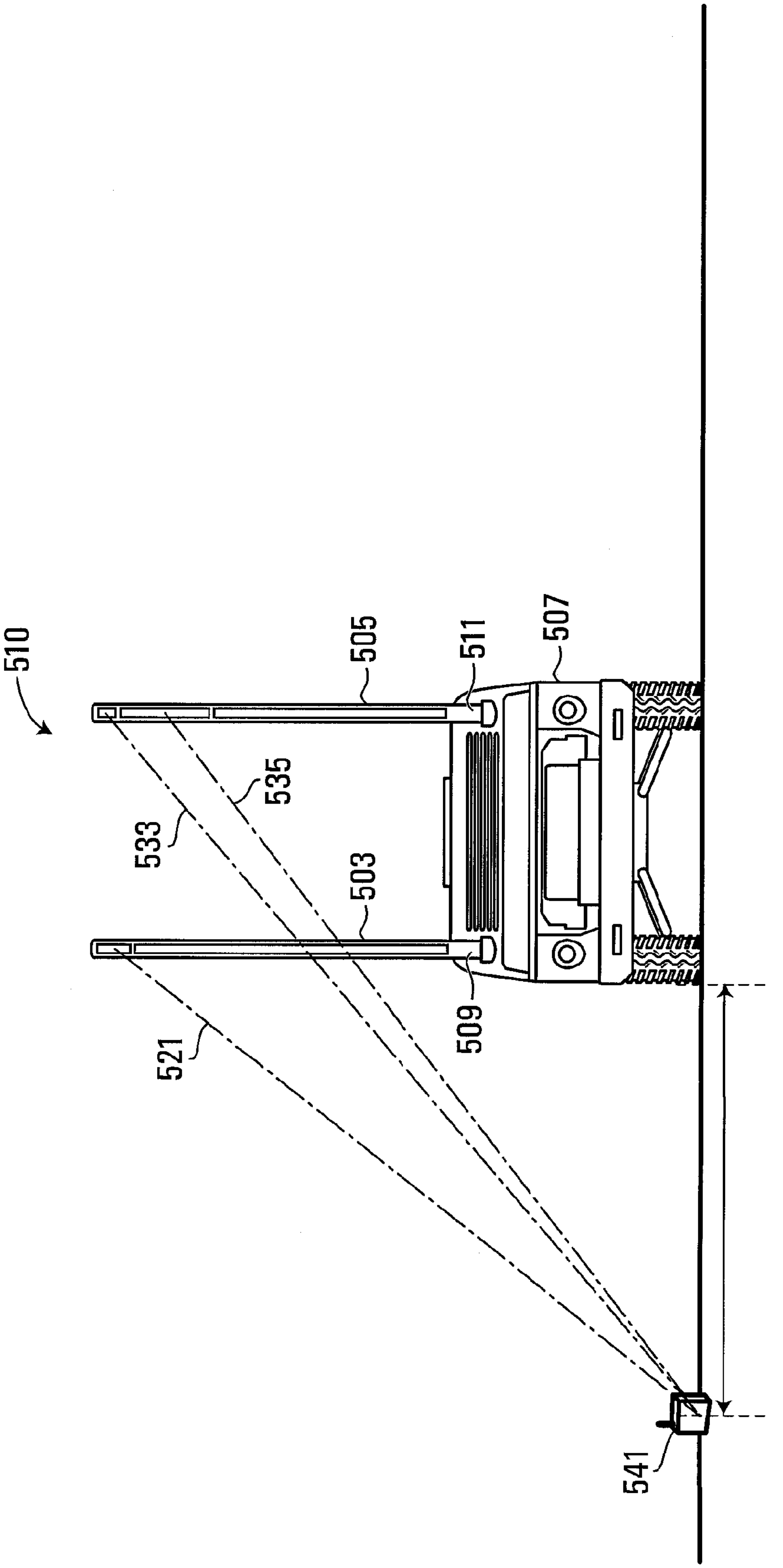
FIG. 13 shows a rear view of an antenna assembly according to an embodiment of the present invention.
Figure 14:
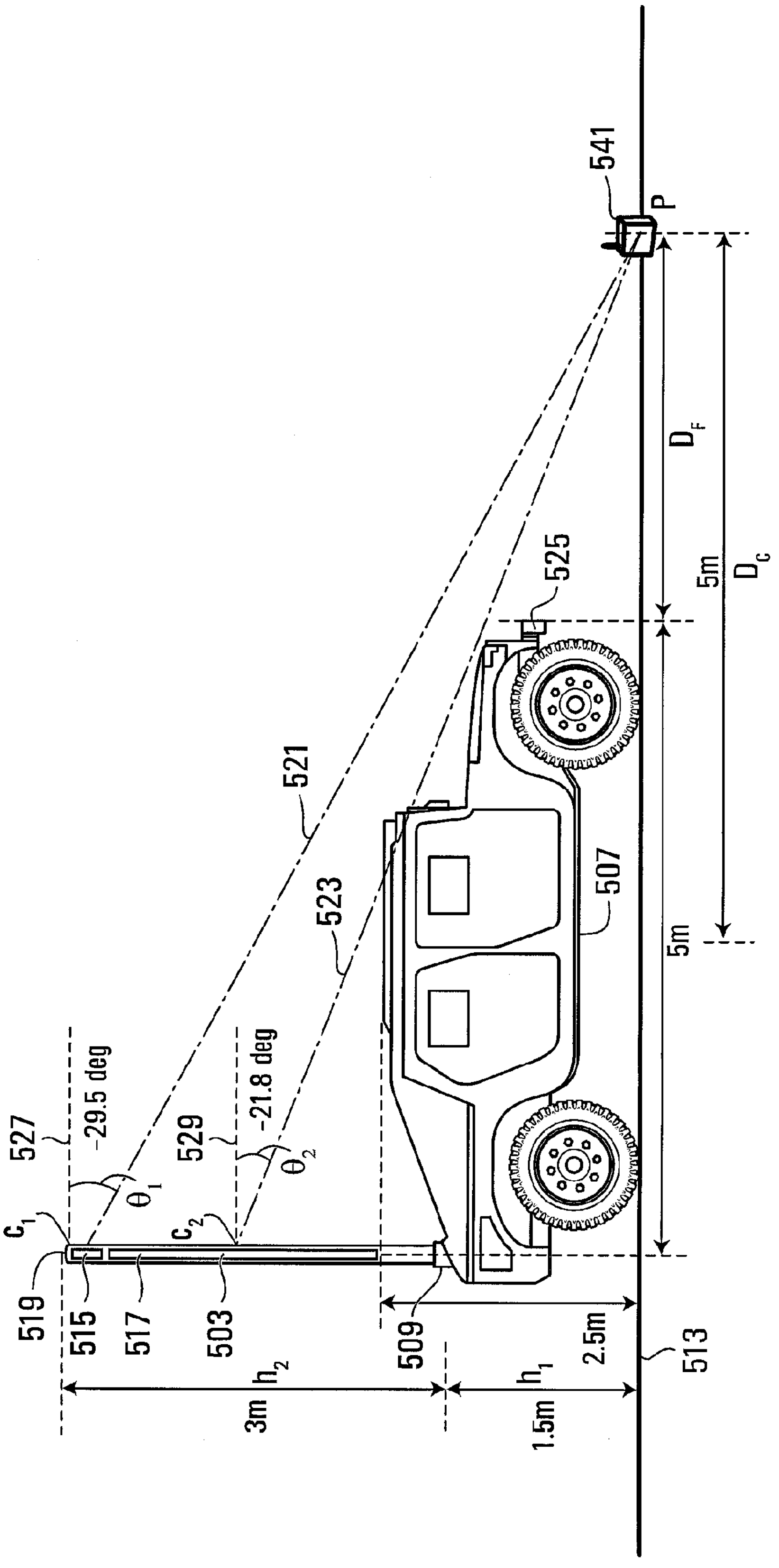
FIG. 14 shows a side view of an antenna assembly according to an embodiment of the present invention.
Figure 15:
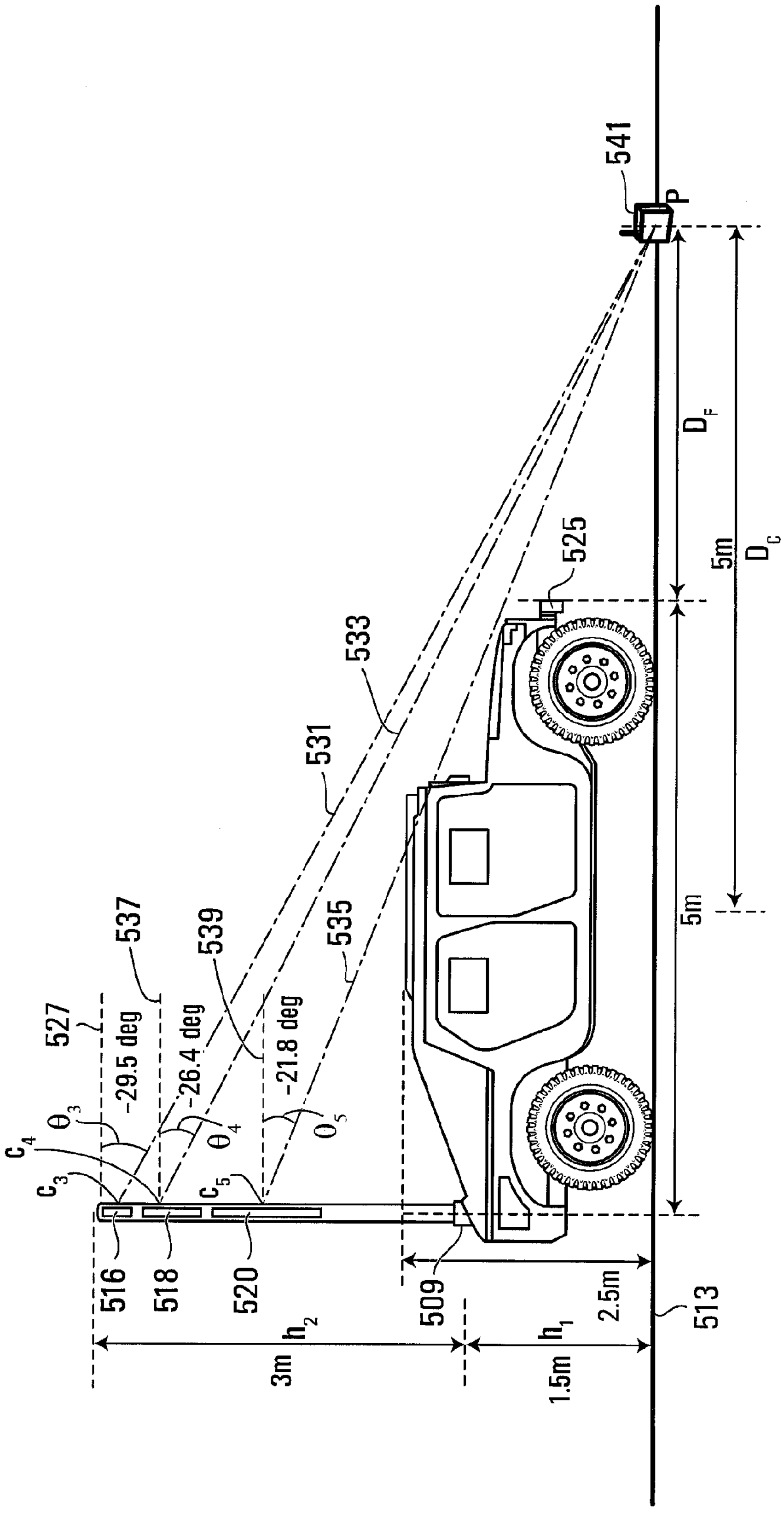
FIG. 15 shows a side view of an antenna assembly according to an embodiment of the present invention.

FIGS. 13 to 15 show an example of an antenna system mounted on a vehicle. The antenna system 501 comprises first and second antenna assemblies 503, 505 mounted on and upstanding from the rear portion of a vehicle 507. Each antenna assembly 503, 505 has a base 509, 511 which, when mounted on the vehicle, is positioned at a height $h_1$ above the surface 513. In a specific, non-limiting example, the height $h_1$ is 1.5 meters. FIG. 14 shows a side view of the first antenna assembly 503 which, in this embodiment, includes two antennas 515, 517, in which the first antenna 515 is positioned above the second antenna 517. The antenna assembly has a height $h_2$ from the base 509 to the top 519, and in a specific, non-limiting example, the height $h_2$ is 3 meters. FIG. 14 shows two lines 521, 523 from the center C1, C2 of the respective first and second antennas 515, 517 to a point P on the surface 513 positioned at a distance $D_C$ from the center of the vehicle 507 or a distance $D_F$ from the front peripheral edge 525 of the vehicle. In a specific, non-limiting example, the distance $D_C$ is 5 meters and the distance $D_F$ is 2.5 meters. The angle θ1 between the horizontal line 527 and the line 521 in this example is −29.5° and the angle θ2 between the horizontal line 529 and line 523 in this example is −21.8°. Both angles are less than the elevation angle of 40° in which radiation emitted from a typical dipole antenna is reduced from a maximum by 3 dB. The line 521 constitutes a direct path from the first antenna 515 to point P on the surface, i.e. without obstruction by the vehicle. This arrangement allows the intensity of high frequency radiation that would normally be scattered by the vehicle, to be relatively high at point P, as described above. The first antenna assembly 503 may be the same or similar to that described above, with reference to FIGS. 4 and 6.

Referring to FIG. 15, the second antenna assembly comprises three antennas 516, 518, 520 positioned one above the other in a stacked configuration. FIG. 15 shows lines 531, 533, 535 between a respective center $C_3$, $C_4$, $C_5$ of each antenna to point P of the surface 513. The angle $\theta_3$ between the horizontal line 527 and line 531 in this example is −29.5°, the angle $\theta_4$ between the horizontal line 537 and line 533 in this example is −26.4° and the angle $\theta_5$ between the horizontal line 539 and line 535 in this example is −21.8°. Each angle $\theta_3$, $\theta_4$ and $\theta_5$ is less than the elevational angle of 40° at which radiation emitted by a typical dipole antenna is reduced by 3 dB. Lines 531 and 533 between point P and the first and second antennas 516, 518 constitutes a direct path for electromagnetic radiation to the surface, without obstruction from the vehicle. This arrangement enables the intensity of relatively high frequency radiation that would normally be reflected by the vehicle, to be relatively high at point P. The second antenna assembly 505 may be the same or similar to the antenna assembly described above with reference to FIGS. 5 and 7. Any one or more antennas of the first and second antenna assemblies shown in FIGS. 13 to 15 may tilt the radiation distribution downwardly and/or provide a more concentrated distribution of electromagnetic radiation.

The combination of the first and second antenna assemblies 503, 505 of the antenna system 501 shown in FIGS. 13 to 15 enable relatively high frequency radiation emitted by the antenna system to have a relatively high intensity at positions close to the vehicle so that, for example, the intensity of high frequency signals received by a receiver 541 located at position P is relatively high.

Another aspect of the present invention provides an antenna which is capable of biasing the spread of emitted electromagnetic radiation either downwardly or upwardly, i.e. in a direction other than 90° relative to the antenna axis. Examples of embodiments of the antenna will now be described with reference to FIGS. 16A to 16C.

Figure 16A:
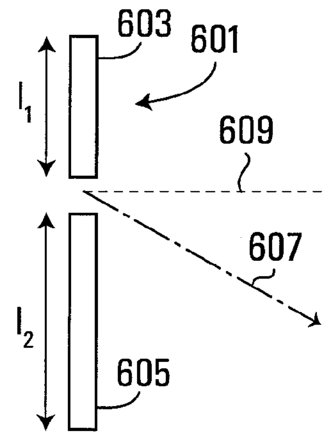
FIG. 16A shows a side view of a dipole antenna according to an embodiment of the present invention.

FIG. 16A shows an example of a dipole antenna 601 having upper and lower dipole elements 603, 605. In this embodiment, the length $L_2$ of the lower antenna 605 is greater than the length $L_1$ of the upper element 603, and this results in the spread of electromagnetic radiation being biased in a downward direction, as for example, shown by the direction of the broken line 607 relative to the horizontal line 609. In this embodiment, the width or diameter of the dipole elements is the same, although in other embodiments the widths or diameters of the dipole elements may be different from one another.

Figure 16B:
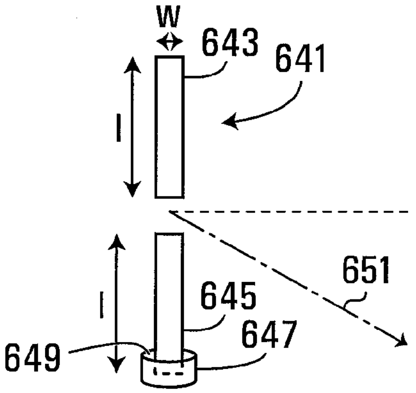
FIG. 16B shows a side view of a dipole antenna according to another embodiment of the present invention.

FIG. 16B shows another embodiment of a dipole antenna 641. The antenna comprises upper and lower dipole elements 643, 645 each of which has the same length, l, and optionally the same width, w. The antenna further comprises a coupling (or parasitic) element 647 which preferentially couples to the lower dipole element 645. In this embodiment, the coupling element 647 comprises a cylindrical ring which partially overlaps the length of the lower element 645 and is spaced therefrom by a gap 649. In other embodiments, the coupling element 647 may have any other form. The additional coupling element 647 has the effect of biasing the spread of electromagnetic radiation emitted from the antenna 641 in a downward direction as indicated by the broken line 651.

In the above antenna configurations shown in FIGS. 16A and 16B, the electrical length of the lower dipole element is longer than the electrical length of the upper element, thereby biasing the spread of electromagnetic radiation in a downward direction. Similar principles may be used to bias the spread of electromagnetic radiation in an upward direction, if desired.

In other embodiments, the features of the embodiments of FIGS. 16A and 163 responsible for biasing the direction of radiation up or down may be combined. For example, the antenna may have a lower dipole element that is longer than the upper element, and a parasitic element preferentially coupled to the lower element.

Figure 16C:
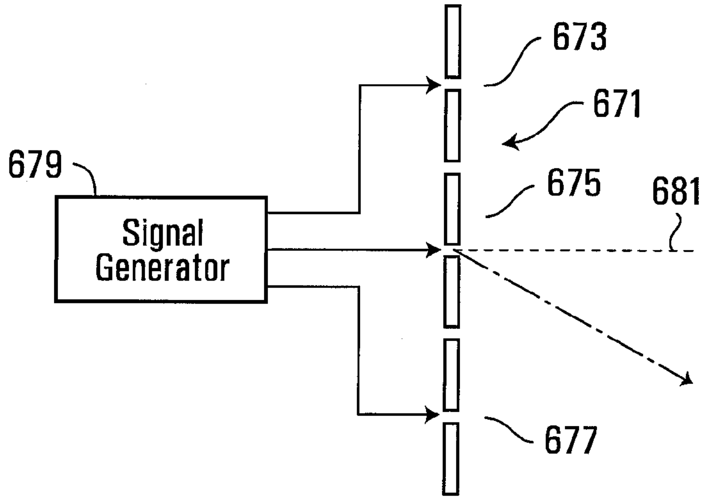
FIG. 16C shows an array of dipole antennas according to another embodiment of the present invention.

FIG. 16C shows another embodiment of an antenna array 671 comprising three stacked dipole antennas 673, 675, 677 each of which is connected to a signal generator 679. The signal generator 679 is adapted to generate a signal for each antenna in which the relative phase of the signals can be controlled to direct the spread of electromagnetic radiation in a desired direction, for example at an angle relative to the line 681 which is perpendicular to the dipole antenna axis. In this embodiment, each dipole antenna has the same length and each dipole element of each antenna also has the same length and the same width. In other embodiments, the length of one dipole antenna maybe different to at least one other dipole antenna to assist in biasing the emitted radiation in a desired direction. Alternatively, and/or in addition, one or more dimensions of a dipole element of an antenna may be different to that of the other dipole element of the same antenna to assist in biasing the spread of electromagnetic radiation in the desired direction. Alternatively, or in addition, one or more parasitic coupling elements may be included which couple to one or more elements of the same or different antennas in the array.

Adaptive Coverage

As described herein, omni-directional antennas used in vehicle-mounted jamming applications enable jamming signals to be emitted in all directions and effectively jam RF remote control signals intended to detonate RCIEDs (remote controlled improvised explosive devices), independently of the orientation of the vehicle relative to the IED. Thus, as the intensity of the jamming signal is substantially uniform for all azimuthal angles of the antenna, no region, for example, to a side or the rear of the vehicle is left unprotected and vulnerable. Embodiments of the antenna assembly described above enable the radiation pattern to be biased or tilted downwardly, below the horizon, to provide relatively high gain and effective jamming coverage close to the vehicle. However, there may also be a requirement to provide effective coverage at extended distances from the vehicle. Omni-directional, broad vertical beam antennas have lower gain than directional antennas, and may not satisfy the gain necessary for the jammer to be effective at sufficient distances from the vehicle. While directional antennas may have the required gain at extended distances, they do not provide full azimuthal coverage leaving the vehicle vulnerable in certain directions, as indicated above. Another aspect and embodiments of the invention provide a solution to this problem, as described below.

According to one aspect, an apparatus comprises antenna means for transmitting RF radiation and being structured to enable the distribution of RF energy emitted therefrom to be varied in the vertical plane, signal generator means for generating an RF signal and adapted to pass the signal to said antenna means, and a controller arranged to control the distribution of RF energy emitted from the antenna in the vertical plane.

In this arrangement, the controller is capable of varying in the vertical plane, the distribution of RF energy emitted from the antenna. The distribution may be varied by changing the angle at which the radiation is emitted from the antenna. For example, the angle may be varied between an angle at which the distribution is directed generally horizontally or orthogonal to the longitudinal axis of the antenna, to an angle at which the distribution is directed downwardly (or upwardly). Alternatively, or in addition, the distribution may be varied by varying the elevational spread (i.e. directionality) of radiation emitted from the antenna, for example, between a relatively narrow (focussed) angular spread and a relatively broad angular spread. This may be implemented by changing the number of antennas in a vertical array that are emitting RF radiation at any one time by switching different antennas in and out, or by switching between different antennas in the same or different antenna assembly.

In some embodiments, two or more antenna assemblies may have different radiation patterns in the vertical plane, e.g. directed in different directions and/or different angular spreads, and the radiation pattern may be varied by activating and/or deactivating different antenna assemblies. Either or both techniques may be used to vary the effective range and coverage area of emitted RF radiation.

Figure 17:
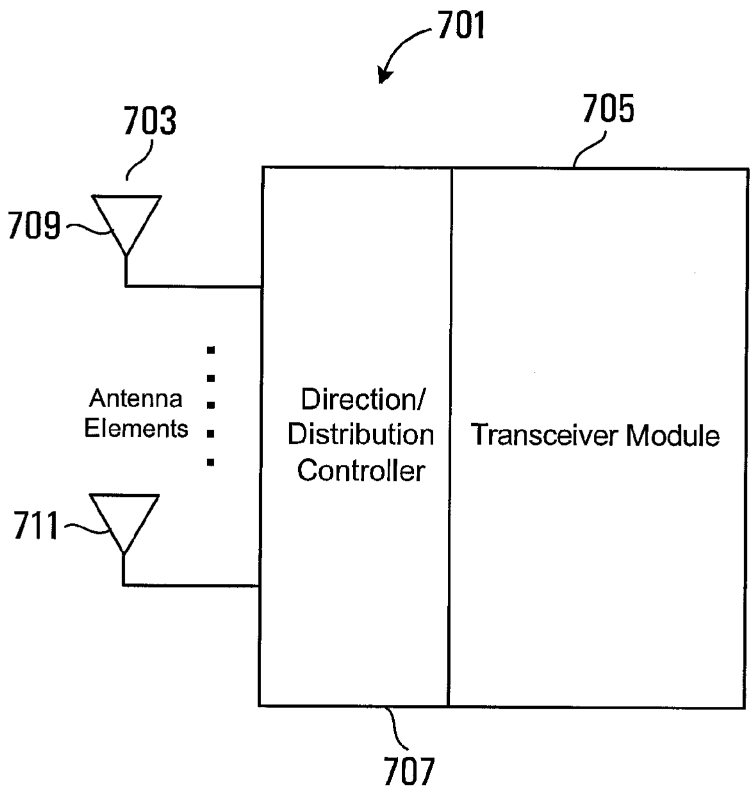
FIG. 17 shows a block schematic diagram of an apparatus for controlling the distribution of RF radiation in a vertical plane, according to an embodiment of the present invention.

An embodiment of this aspect of the invention will now be described with reference to FIGS. 17 to 19. Referring to FIG. 17, the apparatus 701 comprises an antenna assembly 703, a transceiver module 705, which includes a signal generator for generating an RF signal, and a controller 707, which receives the RF signal from the transceiver module and controls the distribution of RF energy emitted from the antenna assembly in the vertical plane. The antenna assembly 703 comprises two or more antennas 709, 711, generally positioned one above the other. In some embodiments, the antenna assembly may comprise any of the antenna assemblies described above with reference to FIGS. 1 to 16C. In one embodiment, the controller is configured to control the distribution of RF energy emitted from the antenna assembly by controlling (varying) the phase of an RF signal passed to at least one antenna relative to the phase of an RF signal passed to one or more other antennas of the antenna assembly. The gain of the antenna assembly is proportional to the number of antennas, and the vertical beam width is inversely proportional to the number of antennas. In some embodiments, the antenna gain and vertical beam width may be varied by varying the number of antennas actively transmitting.

Figure 18:
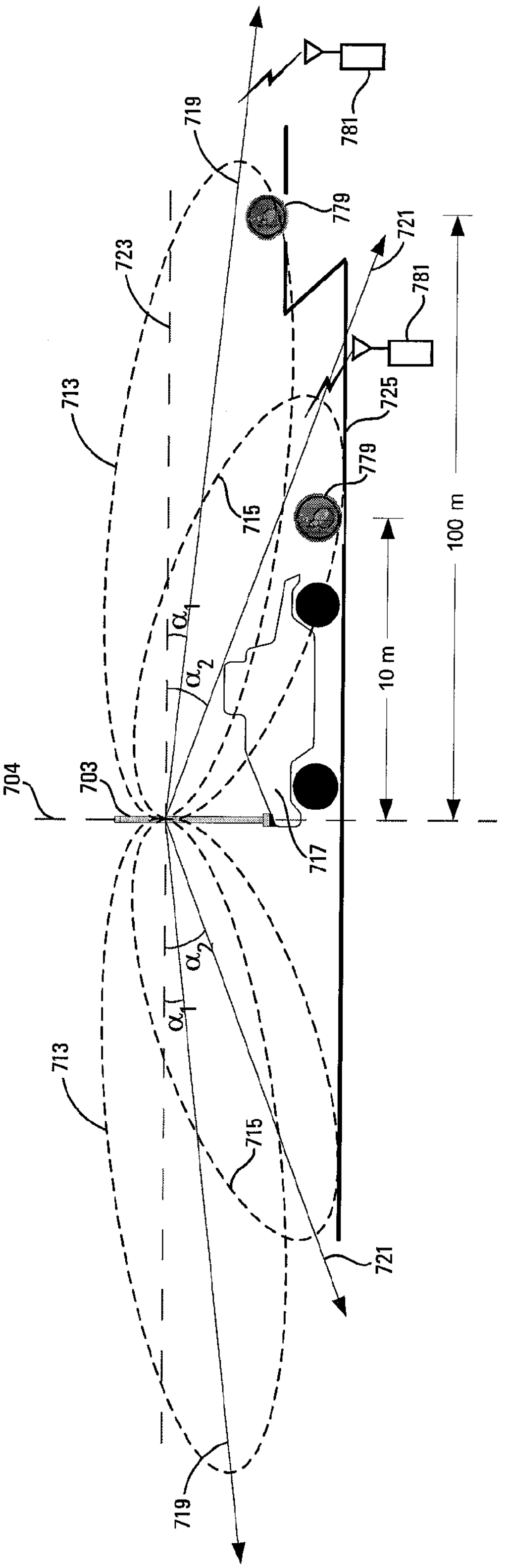
FIG. 18 shows a side view of an antenna assembly mounted to a vehicle with different radiation patterns.

FIG. 18 shows an example of first and second distributions of RF energy 713, 715 emitted from an antenna assembly 703, which is mounted on a vehicle 717. In this example, both distributions are substantially circularly symmetric about the longitudinal axis 704 of the antenna assembly, and have a generally toroidal shape, as may be produced by dipole antennas. However, the toroidal distribution is elongated (elliptical) in the horizontal direction, and therefore has increased directionality and gain transverse to antenna axis. In addition, both distributions are asymmetric in the vertical plane, being angled downwardly relative to the horizontal (or a line orthogonal to the longitudinal axis 704 of the antenna assembly 703). The mean or average direction of each distribution in the vertical plane is indicated by lines 719 and 721, respectively. In this example, both the first and second distributions 713, 715 are angled downwardly with respect to the horizontal 723, with the second distribution 715 having a greater tilt angle $\alpha_2$ than the first distribution 713 ($\alpha_1$). Thus, in the case of the first distribution, RF energy is directed more towards the horizon and has an extended range relative to the second distribution. The downwardly directed, second distribution effectively has a shorter range with more energy being concentrated at the surface 725 in proximity to the vehicle and antenna assembly. Thus, this arrangement produces a variable directional gain in the vertical plane, while maintaining omni-directional gain in the horizontal plane.

The direction of the emitted RF beam of radiation may be controlled based on the positional relationship, for example distance, between the antenna assembly and an object. The apparatus may include means for detecting the presence of an object and determining the distance to the object. The object may be a communication device having an RF receiver, an RF transmitter or both. In one example, the communication device is an RF transmitter for remotely detonating an improvised explosive device. The apparatus may be adapted to detect RF signal(s) transmitted from the device and determine or estimate the distance between the apparatus and the device based on the detected signal. In another example, the communication device may be relatively benign. For example, the device may be adapted to receive data from a vehicle and/or transmit data to a vehicle.

Figure 19:
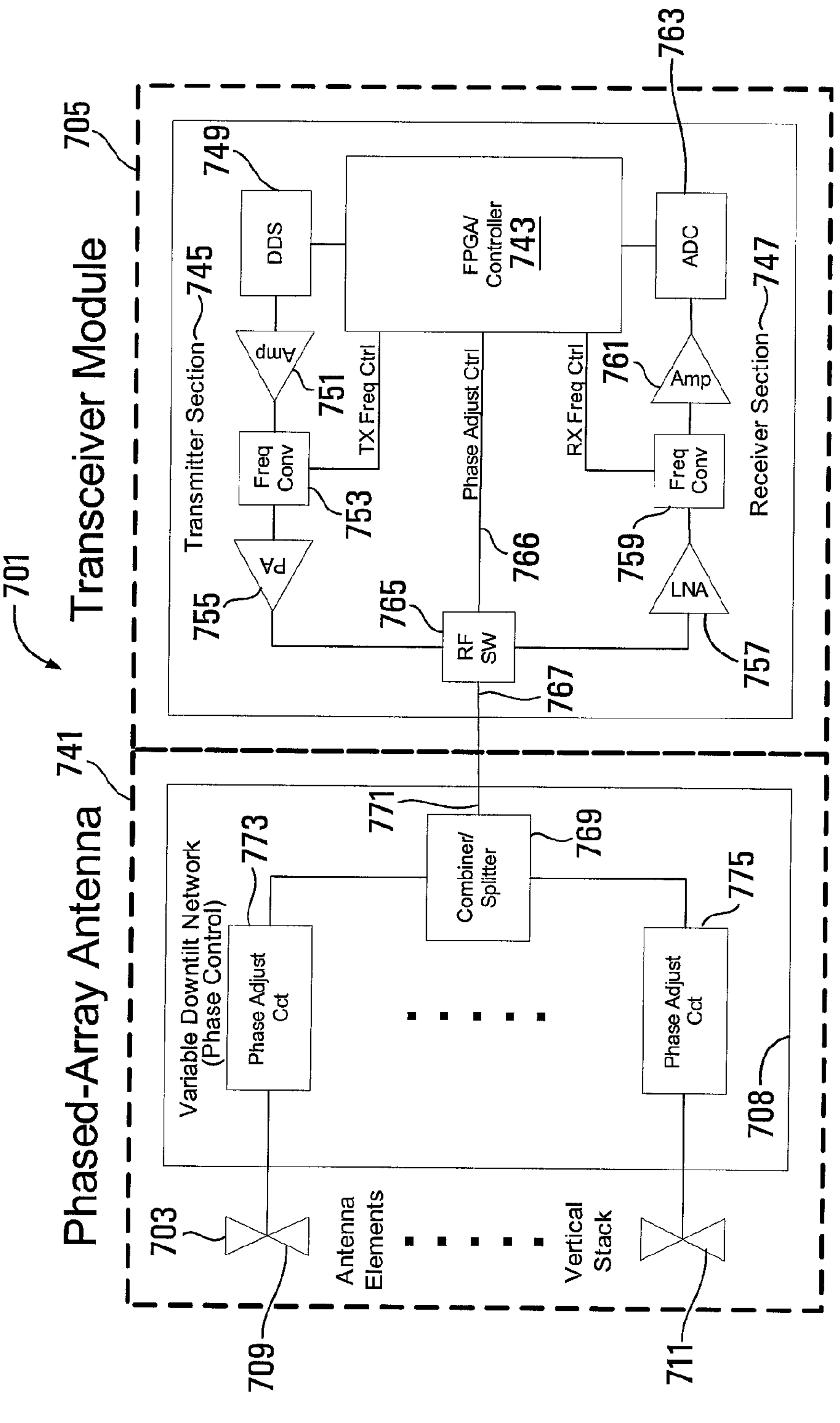
FIG. 19 shows a block diagram of an apparatus for controlling the distribution of RF radiation emitted from an antenna assembly in the vertical plane, according to an embodiment of the invention.

FIG. 19 shows an example of an apparatus which is capable of determining the positional relationship between the apparatus and an object and controlling the distribution of RF energy emitted from the antenna assembly based on the determined positional relationship. Referring to FIG. 19, the apparatus 701 comprises a phased-array antenna 741 and a transceiver module 705. The transceiver module includes a controller 743, a transmitter section 745 and a receiver section 747. The transmitter section includes a signal generator 749, an amplifier 751, a frequency converter 753 and a power amplifier 755. The signal generator 749 may comprise any suitable signal generator, a non-limiting example of which is a direct digital synthesis (DDS) signal generator. The receiver section includes a low noise amplifier 757, a frequency converter 759, an amplifier 761 and an analog-to-digital converter (ADC) 763. The transceiver module 705 further includes a switch 765 for switchably coupling one of: (1) the output of the power amplifier 755 of the transmitter section, (2) the input of the low noise amplifier 757 of the receiver section and (3) a phase adjust control signal from the controller 743, to an input/output port 767 of the transceiver module.

The phased-array antenna 741 includes an antenna assembly 703 including a plurality of antennas 709, 711 and a phase controller 708. The phase controller includes a combiner/splitter 769 having a first input/output port 771 connected to the input/output port 767 of the transceiver module, and a respective phase adjuster 773, 775 connected between a respective antenna 709, 711 and the combiner/splitter 769. One or more phase adjusters may be controlled by a control signal 766 from the controller 743. Each phase adjuster may be independently controllable, or two or more phase adjusters may be controlled together, for example, by the same or common control signal.

Various modes of operation of the apparatus are described below by way of non-limiting examples only. In some examples, it is assumed that the transceiver module is adapted to detect RF signals intended to detonate a remote controlled explosive device, and to generate jamming signals to jam the RF detonation signal(s). The transceiver module is adapted to operate at any one time in one of receive mode and transmit mode under the control of the switch 765 which may itself be controlled by the controller 743. In receive mode, RF signals received by the antennas 709, 711 are passed to the combiner/splitter 769 which, in this mode, serves to combine (i.e. sum) the signals and pass the resulting signal to the RF switch 765. The switch directs the signal to the receiver section of the transceiver module for signal conditioning. In this particular embodiment, the signal is amplified by the low noise amplifier 757, optionally down-converted by the frequency converter 759, and the resulting signal (e.g. IF or base band signal) is passed to the amplifier 761. The amplified, analog signal is then digitized by the ADC 763 before being passed to the controller 743. The receiver may operate to scan one or more frequency bands and to provide RF profiles of each band to the controller 743. Each profile may contain channelized frequency information and associated power levels, e.g. absolute power levels. The controller may examine frequencies within each channel to identify one or more threats and determine appropriate jamming frequencies. In some embodiments, the frequency profile data information for all channels or bins are collected and/or examined simultaneously. The signal detecting frequency band may be centred on a frequency of interest. The controller instructs the transmitter section to generate the appropriate jamming signal(s) to defeat the identified threat(s). The controller also determines the positional relationship between the apparatus and one or more threats, and produces one or more control signals to the phased-array antenna 741 to control the distribution of emitted radiation in the vertical plane to provide appropriate coverage of the jamming signal(s) based on the determined positional relationship.

The transmitter section 745 generates RF jamming signal(s) at the appropriate frequencies and passes the RF signal(s) to the phase controller 741. In this embodiment, signals are generated by the signal generator 749, passed to the amplifier 751 and upconverted to the final frequencies by the frequency converter 753. The upconverted RF signal is then passed to the power amplifier 755, through the RF switch 765 to the combiner/splitter 771 which, in transmission mode, splits the RF signal into separate signals for transmission to a respective phase adjuster 773, 775. The RF signals are subsequently passed from each phase adjuster to a respective antenna of the antenna assembly for wireless transmission.

The controller 743 includes determining means for determining the positional relationship between the apparatus and the source of the received RF signal. The positional relationship may be determined based on any one or more characteristics of the received signal, which include but are not limited to (1) the strength of the received signal, (2) the direction of change of the strength of the received signal with time (i.e. increasing or decreasing), (3) the rate of change of received signal strength, (4) the relative phase between RF signals received by two or more antennas of the antenna assembly, (5) the direction of change of the relative phase in (4), and (6) the rate of change of the relative phase in (4).

The amplitude or strength of the received signal can provide a measure of the distance between the apparatus and the remote RF signal source. For example, the remote control transmitter may comprise a portable or mobile device generating a transmit signal of between 1 to 20 Watts, or may comprise a base station of a cellular system generating a signal of about 100 Watts at the transmitter. Thus, assuming knowledge of the type of transmitter transmitting the remote control detonation signal, the distance from the transmitter to the apparatus can be determined based on the signal propagation loss.

A measure of the direction of change of signal strength or amplitude provides an indication of whether the distance between the apparatus and source is increasing or decreasing, for example, whether the vehicle is moving towards or away from the source.

The rate of change of received signal strength or amplitude also provides information on the distance between the apparatus and source. For example, between 10 meters and 1 meter away from the source, the received signal may change by 20 dB. Between 100 meters and 10 meters, the same signal may also change by 20 dB. However, assuming a constant speed, it takes longer to travel from 100 meters to 10 meters away from the target than it does from 10 meters to 1 meter away from the target. Accordingly, if the rate of change of signal strength is high, it can be deduced that the source is close to the vehicle, whereas if the rate of change is low, it can be determined that the vehicle is further away. Change in distance can be measured by a GPS system with a high degree of accuracy, or simply measured by the vehicle's odometer, and/or with use of a vehicle's speedometer. Whether the rate of change is increasing or decreasing may also provide information as to whether the threat is becoming closer or further away, respectively.

The magnitude of any phase difference between two RF signals received at two antennas located at two different vertical positions can also provide information on the distance between the apparatus and source. For example, if the phase difference between the two signals is zero or relatively small, this may provide an indication that the distance between the source and apparatus is relatively large. On the other hand, an increase in phase difference can be attributed to an increase in the difference between the lengths of the propagation paths between the source and the two antennas by virtue of their different vertical positions. As the distance between the antenna and the source decreases, this difference in path length and therefore the phase difference increases.

The embodiment of FIG. 19 may be controlled to detect the presence of a phase shift between RF signals received at two antennas, and may further be adapted to provide a relatively accurate measure of phase difference between the two signals. The presence or absence of a phase shift may be detected as follows. With each phase adjuster set to add no phase change in the signal path between each antenna 709, 711 and the combiner/splitter 769, the RF signals from each antenna are combined (i.e. summed) in the combiner/splitter and the amplitude of the resulting signal is measured. This measurement may be made by the controller 743 after the resultant signal has been conditioned by the receiver section 747.

A phase difference between the two signal paths between the antennas 709, 711 and the combiner/splitter 769 is then introduced by, for example, adjusting one of the phase adjusters, or both. The RF signals received by each antenna 709, 711 are then added together by the combiner and the amplitude of the resulting signal is measured and compared with the magnitude of the resulting signal measured without any artificial phase change introduced into the signal paths. The two measurements may be made in either order.

In the measurement where no artificial phase change is introduced into the signal paths, if there is no phase difference between the RF signals received at the antennas 709, 711, the magnitude of the signal from the combiner will be a maximum value for the combined signals. However, if there is a phase difference between the two RF signals received at the antennas, the resulting amplitude will be less than the maximum amplitude. However, with the introduction of an artificial phase difference between the two signal paths, the phase difference between the two signals can be compensated and the signals brought into phase or at least their relative phase difference reduced so that the resulting signal from the combiner is higher than that without the introduction of any artificial phase difference between the signal paths.

Thus, assuming that any artificial phase difference introduced between the two signal paths effectively increases alignment of the phases of both signals, if the magnitude of the signal without any artificial phase difference is higher than that when an artificial phase difference is introduced, the source may be determined as being further away from the antenna assembly. On the other hand, if the magnitude of the signal with an artificial phase difference introduced into the signal paths is higher than that without the introduction of any artificial phase difference, it can be determined that the source is nearer to the antenna assembly.

In some embodiments, a phase adjuster may be capable of providing a single phase adjustment, for example a phase value of zero and one other value, or a single added time delay, whereas in other embodiments, the phase adjuster may be capable of providing a number of different discrete phase adjustments or be capable of providing continuously variable phase adjustments. Enabling a number of different phase adjustments to be made allows the phase difference between to the two RF signals to be measured more accurately, which in turn may allow a more accurate measurement of the distance between the antenna assembly and the signal source. For example, with a continuously variable phase adjuster, the artificial phase difference between the two signal paths can be varied until the combined resulting signal reaches a maximum value, the phase difference at that value providing a measure of the phase difference between the two RF signals and therefore the distance between the signal source and antenna assembly.

Varying the phase difference between the two signal paths effectively changes the "look" angle of the antenna array. By changing the look angle and monitoring the amplitude of the signal between different look angles, information on the location of the signal source can be obtained.

Some embodiments of the phase controller are capable of varying the direction of emitted radiation from the antenna assembly between one of two different directions only, for example, a first direction in which the emitted radiation is directed substantially horizontally or towards the horizon and a second direction in which the radiation is directed downwardly, for example, at an angle between 0 and 45° or more to the horizontal direction. To implement this bistate system, a phase adjuster may simply comprise a delay line which is selectively switched in and out of the signal path, depending on whether or not a phase change is to be introduced. With an antenna assembly having just two antennas, a phase adjuster in only one of the paths between the combiner/splitter and one of the antennas is required. In other embodiments, a respective phase adjuster may be included in the signal paths to both antennas. With an antenna assembly having three or more antennas, a phase adjuster may be included in only one of the signal paths to a particular antenna, or a phase adjuster may be included in only some of the signal paths or all of the signal paths to the antennas.

In other embodiments, the phase controller may be adapted to enable the direction of emitted radiation to be selected from three or more different directions. This may be achieved by enabling one or more phase adjusters to introduce one or more of a plurality of discrete, different phase changes into the signal path. This may be implemented by a plurality of delay lines each constituting a predetermined time delay and switching one or more selected delay lines into the signal path. The time delay may be varied by changing the number of delay lines switched into a signal path (in series) and/or by selecting delay lines of different lengths. Alternatively, or in addition, enabling the direction of emitted radiation to be controlled between three or more different directions, may be implemented by changing the selection of signal paths in which to apply a phase change.

In other embodiments, at least one or more phase adjusters may be capable of applying a continuously variable phase change to the signal. In one embodiment, this may be implemented by a PSK (phase shift keying) modulator, for example, or any other suitable means.

As indicated above, the direction of the emitted radiation may be controlled in response to and based on the positional relationship between the apparatus and an RF signal source and/or relative movement therebetween. The direction of the beam may be changed when it is determined that the positional relationship and/or relative movement meets a predetermined criteria. The predetermined criteria may be defined by one or more threshold values of one or more parameters defined by or deduced from a signal or signals received from the RF signal source. For example, if the amplitude of the received signal is at or below a predetermined threshold, it may be determined that the antenna assembly is more than a certain distance away from the RF signal source, and the phase controller is controlled so that the RF radiation transmitted from the antenna assembly is directed towards or generally towards the horizon. When a condition is reached that the RF signal amplitude exceeds the predetermined threshold value, it may be determined that the antenna assembly is within a predetermined distance of the RF signal source and the phase controller adjusts the phase to direct the RF radiation downwardly. Once the received RF signal amplitude decreases below a predetermined threshold, the phase controller may adjust the phase to redirect the beam towards the horizon.

Returning to FIG. 18, a remote controlled explosive device 779 and an associated radio transmitter 781 for detonating the explosive device are shown at two different positions relative to the vehicle 717 to which the apparatus is mounted. When the vehicle is relatively far away from the radio transmitter and explosive device, RF radiation from the antenna assembly 703 is directed generally towards the horizon, as indicated by arrow 719. As the vehicle approaches the transmitter 781 and explosive device, at a certain distance, the RF radiation from the antenna assembly 703 is tilted downwardly, for example, in the direction indicated by arrow 721 to increase the antenna gain in regions close to the vehicle. Once the received signal from the RF transmitter 781 begins to decrease, it may be determined that the vehicle is moving away from the RF transmitter and explosive device. When it is determined, for example, from the amplitude of the received RF signal that the vehicle has moved a sufficient distance away, the RF radiation emitted from the antenna assembly 703 may be raised towards the horizon to increase the gain of the antenna at positions more distant from the vehicle, and thereby possibly to continue to jam the RF transmitter 781.

Typically, the radio transmitter and explosive device, are separated by several hundred meters. Therefore, it is possible that the vehicle may be positioned with the RF transmitter 781 behind the vehicle and the explosive device in front of the vehicle. In this situation, the vehicle may be moving away from the transmitter, in which case the amplitude of the RF signal is decreasing, while the vehicle is actually approaching the threat. To ensure that the antenna gain in the near field region around the vehicle remains sufficiently high to effectively jam the RF detonation signal, the threshold value of the received RF signal amplitude which determines the signal level at which the direction of the emitted radiation is raised, may be set at a sufficiently low value. For example, the threshold value may be set at a level at which the received RF signal is too weak to activate the explosive device. In some embodiments, the threshold value used to change the direction of the emitted radiation when the vehicle is approaching the RF source may be different, for example, higher than the threshold used to raise the direction of emitted radiation when the vehicle is moving away from the RF source. Thus, different thresholds, windows, or ranges of received RF signal level may be used to control the RF distribution of the antenna assembly.

In some embodiments, where the direction of the emitted radiation may be continuously varied or varied between a number of discrete directions, each direction may be selected based on a determination that the antenna assembly is at a particular distance from a target or within a particular range of distances from a target. Each predetermined distance or range may be defined by a threshold value. The threshold value may be a value of the amplitude of the received signal and/or a phase difference between RF signals received at different antennas of the antenna assembly. In some embodiments, the threshold values may be values of the rate of change of received RF signal strength and/or phase difference.

Embodiments of the apparatus may be used to determine the positional relationship between a transmitter and the antenna assembly either with or without the implementation of a transmitting (e.g. jamming) capability. As indicated above, the apparatus may be adapted to sense phase difference between RF signals received at two different antenna of the antenna assembly. The phase difference provides a measure of the distance of a transmitter from the antenna assembly. The direction of change of the phase difference may provide an indication of whether the distance between the antenna assembly and the transmitter is increasing or decreasing. If the antenna assembly is moving, this information can also be used to determine whether the transmitter is in front or behind the mobile antenna assembly. This information can be used as a decisive factor, together with any other information derived from the received RF signal, for determining the validity of an RCIED transmitter. For example, if the transmitter is far away and decreasing in level, it can be binned as a non-threat located behind the vehicle, thereby allowing the controller to direct more jamming power to transmitter(s) close to the vehicle.

As mentioned above, the distribution of RF energy emitted from the antenna may be varied by varying the elevational spread (i.e. directionality) of the emitted radiation, for example, between a relatively narrow (focussed) angular spread and a relatively broad angular spread. This may be implemented by changing the number of antennas in a vertical array that are emitting RF radiation at any one time by switching different antennas in and out. An example of an embodiment of an apparatus having this capability is illustrated in FIG. 20. Referring to FIG. 20, the apparatus 801 comprises an antenna assembly 803 having a vertical array of three antennas 805, 807, 809, a transceiver module 811 for generating one or more RF signals 812 and a switch 813 for switchably connecting each antenna 805, 807, 809 to the receiver module 811 and to thereby control which of the antennas receives an RF signal from the transceiver module for wireless transmission. The distribution of RF energy emitted from the antenna assembly may be varied in the vertical plane by changing the number of antennas that are actively transmitting at any one time. For example, for a relatively broad RF distribution, the switch 813 may activate any one antenna and for a narrower distribution (i.e. with increased directionality or gain), the switch may activate two or three antennas.

In this embodiment, each of the antennas 805, 807, 809 are dipole antennas each having the same electrical length. In other embodiments, one or more antennas may have a different length to another antenna of the array. In other embodiments, one or more of the antennas in the array may be of a different type than dipole, for example bicone or monopole.

The transceiver module may be similar to that described above with reference to FIG. 19 and may be adapted to control operation of the switch 813, for example by means of a control signal 815 from the controller 743 or from some other control device.

The antenna assembly 803 may also be used to receive RF signals and the switch 813 adapted to pass the RF signals to the transceiver module 811, in a similar manner to that described above with reference to FIG. 19.

In some embodiments, the apparatus 801 may further include a phase controller for controlling the phase of RF signals to two or more antennas of the array to enable the RF distribution from the antenna in the vertical plane also to be controlled by varying the relative phase between the RF signals provided to the antennas, as described above with reference to FIG. 19.

Figure 20:
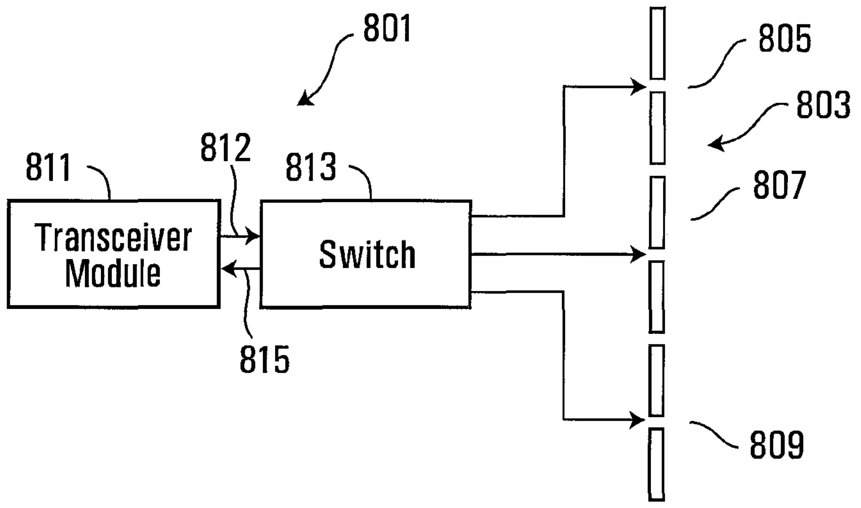
FIG. 20 shows an apparatus for controlling the distribution of RF radiation emitted from an antenna assembly in the vertical plane, according to another embodiment of the present invention.

It is to be noted that in other embodiments, the apparatus, as for example shown in FIGS. 19 and 20, may include a signal generating and transmitting section without a receiver section or a receiver section without a signal generating and transmitting section.

As mentioned above, embodiments of the apparatus may be adapted for communication with one or more external RF transmitters in order to exchange data, for example. In one application, a remote transmitter may comprise a roadside communication beacon. In one such communication system, an antenna assembly having two or more stacked antennas is mounted to a vehicle and the apparatus may be implemented to function as a receiver, a transmitter, or both. In transmit mode, as the vehicle approaches and/or passes and/or is near the roadside communication beacon, the radiation distribution controller (e.g. phase controller) of the apparatus may increase the gain towards the beacon, to increase the signal-to-noise ratio (SNR), and thereby increase the effective bandwidth of the communication link, allowing higher data rate transfers from the antenna assembly to the beacon. With the apparatus operating in receive mode, the phase controller may control the phase between signals received from the beacon by two or more antennas of the antenna assembly, for example, to provide a look angle (up or down, depending on the relative vertical position of the vehicle and beacon) or change the look angle of the antenna assembly, again to increase the signal-to-noise ratio of the received signal and the effective bandwidth of the wireless communication link.

Alternatively, or in addition, the beacon itself may be implemented in accordance with embodiments of the apparatus. The beacon may only have one of a transmit and receive capability or both. The beacon may comprise an antenna assembly having a plurality of antennas positioned at different vertical locations and a controller for controlling the look direction of the antenna in the vertical plane. When the beacon is in transmit mode, as a vehicle approaches, or is near the beacon, the controller controls the direction of the transmitted radiation to increase the gain in a direction towards the vehicle (i.e. upwardly or downwardly), depending on the relative vertical positions between the antenna assembly and the vehicle, to increase the signal-to-noise ratio and the bandwidth of the communication link. In receive mode, the controller may control the look angle of the antenna assembly in a direction towards the vehicle by adjusting the relative phase between the signals received from two or more antennas of the antenna assembly to increase the signal-to-noise ratio of the received signal and the bandwidth of the communication link.

Figure 21A:
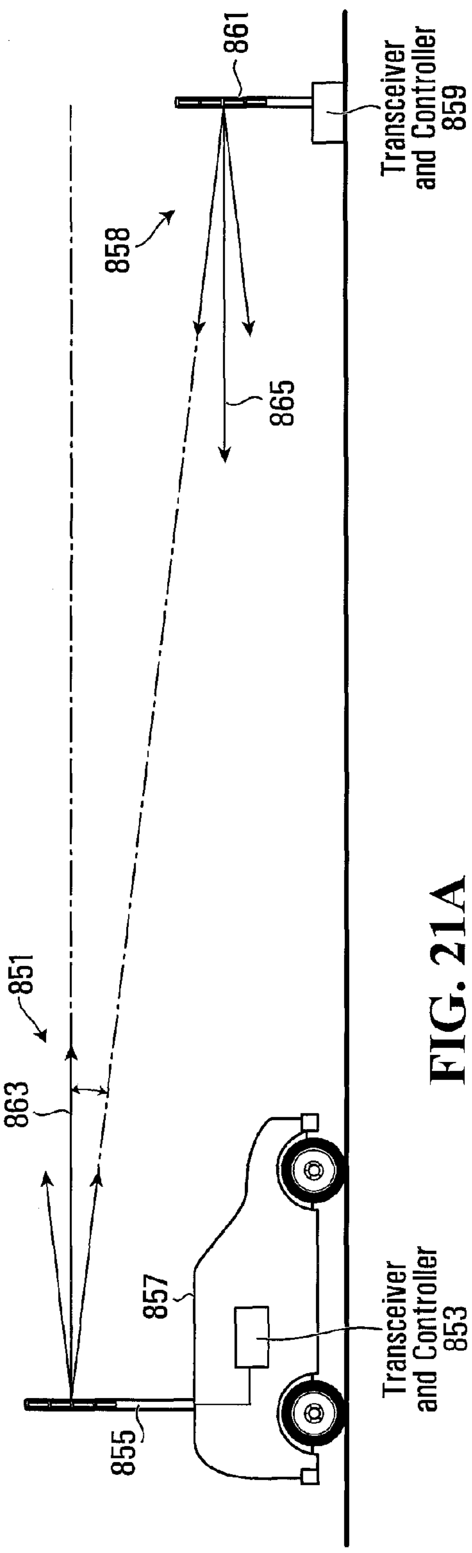
FIG. 21A shows a schematic diagram of a data communication system according to an embodiment of the present invention.
Figure 21B:
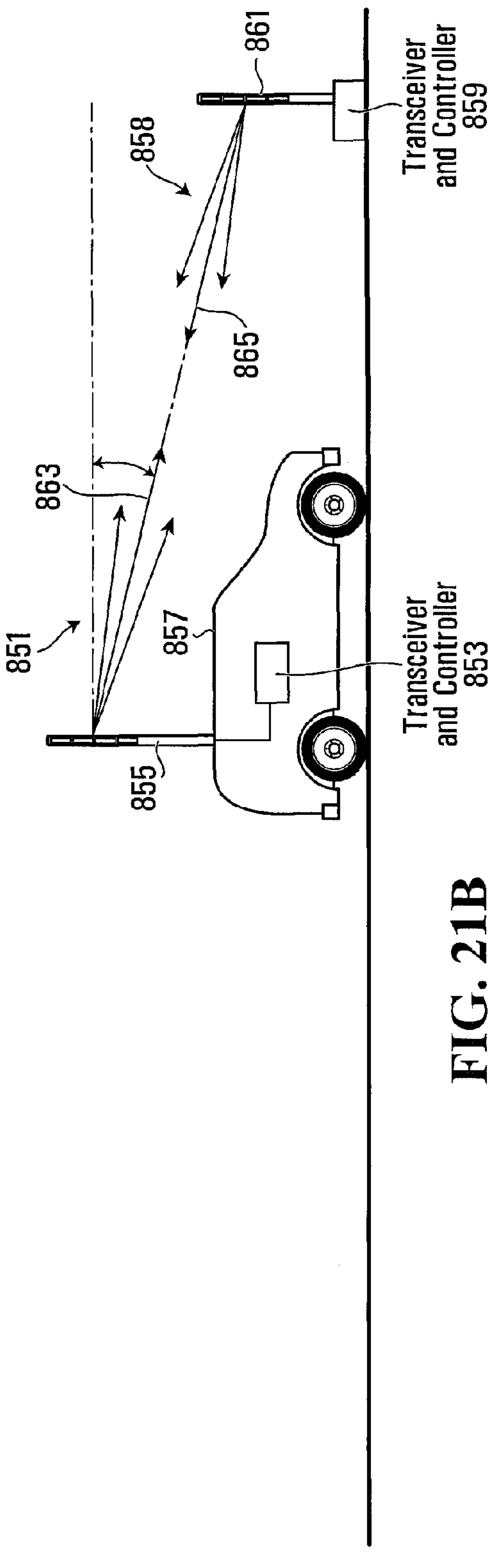
FIG. 21B shows another view of the data communication system of FIG. 21A.

An example of an embodiment of a communication system for exchanging data between a vehicle and a beacon or data collection/transmission unit is shown in FIGS. 21A and 213. The communication system 851 comprises a first transceiver 853 and a first antenna 855 (e.g. a phased array antenna) mounted on a vehicle 857 and a fixed-position data collection and/or data transmitting unit 858 having a second transceiver 859 and a second antenna 861 (e.g. a phased array antenna). The data collection/transmitting unit 858 may be positioned at any suitable location for communicating with the vehicle 857 and possibly with other vehicles, and may, for example, be located near the side of the road. The first and second transceivers may be similar to the transceiver module described above with reference to FIG. 19.

When the vehicle 857 is relatively far from the data collection unit 858, as shown in FIG. 21A, this condition may be detected by the first transceiver module 853 (for example by measuring the amplitude of the signal transmitted by the second transceiver 859 or the relative phase between signals received at each of two antennas of the antenna assembly 855) and the controller may control the phase of RF signals fed to the antenna assembly to direct the RF radiation generally horizontally or towards the horizon as shown by the arrow 863. Similarly, the second transceiver module may determine that the vehicle is relatively far away and also cause its emitted RF radiation to be directed substantially horizontally or towards the horizon, as shown by the arrow 865.

As the vehicle approaches and is close to the data collection unit 858, the proximity may be detected by the first and second transceivers and the first controller may direct the radiation transmitted from the first antenna assembly 855 downwards, and the controller of the data collection unit may direct the RF radiation emitted from the second antenna assembly 861 upwardly towards the first antenna assembly. In receive mode, the first controller may also control the relative phase between signals received by antennas of the first antenna assembly 855 to effectively look down towards the data collection unit, as described above with reference to FIG. 19. Similarly, the controller of the data collection and/or data transmission unit 858 may control the relative phase of received signals by antennas of the second antenna assembly 861 to effectively look up towards the first antenna assembly 855. Again, this may be implemented using the principles described above with reference to FIG. 19. Thus, in this arrangement, as the angle of the direct transmitting/receiving path between the two communicating systems changes as one moves towards the other, the angle of the transmitted radiation is adjusted towards the direct path.

It will be appreciated that in other embodiments, the first transceiver may be replaced by one of a transmitter or a receiver, for one way communication only. Similarly, the second transceiver may also be replaced by a transmitter or a receiver, for uni-directional communication only.

In some embodiments of the apparatus, in which the distribution of RF energy emitted from the antenna is varied in the vertical plane, it may be beneficial to support the antenna at an elevated position above its support structure (e.g. a vehicle) to provide a direct line of sight from at least a portion of the antenna to one or more critical positions at the surface on which the support structure is located. For RF frequencies that would otherwise be scattered and reflected by the support structure, this arrangement may advantageously increase the signal strength at the critical position(s). However, it is emphasized that this additional feature is entirely optional.

Figure 22:
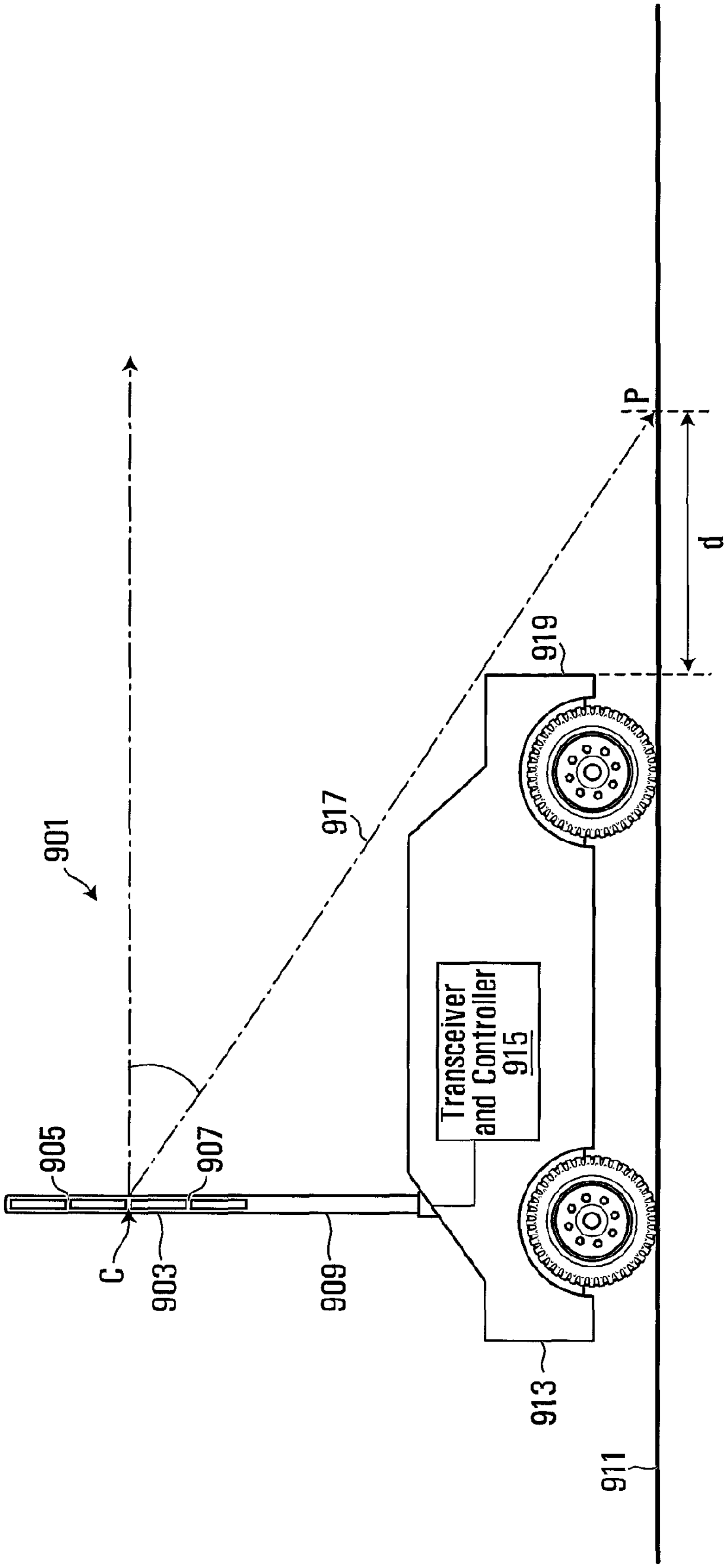
FIG. 22 shows an apparatus according to another embodiment of the present invention.

An example of an implementation of this feature is shown in FIG. 22. Referring to FIG. 22, an RF transmitting and/or receiving system 901 comprises an antenna assembly 903 having first and second antennas 905, 907 positioned at different heights and an antenna support 909 for supporting the antennas 905, 907 at an elevated position above a surface 911 when mounted on a support structure 913, e.g. a vehicle. The system 901 also includes a transceiver and controller 915, which may be similar to that described above with reference to FIGS. 19 and/or 20.

The antenna support 909 is adapted to support the antennas 905, 907 so that at least a portion of one of the antennas 905 has a direct line of sight 917 to one or more critical positions, P, positioned on the surface 911 and spaced a distance, D, from a peripheral edge 919 of the support structure 913. In some embodiments, the critical position may be any one or more of the critical positions described above, for example, with reference to FIGS. 1 to 15. In some embodiments, the critical positions may be any one or more of (1) a position of less than or equal to about 3.6 to 4.5 meters from substantially any point on the peripheral edge, (2) a position at any point between opposed ends of the support structure which is spaced about 2.5 to 3 meters or less from a side of the support structure, (3) a position of about 2.5 to 3 meters or less from a side of the support structure and about 2.5 to 3 meters or less from one or both ends of the support structure, and (4) a position of about 2.5 to 3 meters from an end of the support structure and between a side of the support structure and about 2.5 to 3 meters from the side. In this embodiment, the portion of the antenna array which has a direct line of sight to the critical position, P, includes the middle portion or center, C, of the phased array, although in other embodiments, the portion may be limited to another part of the antenna array, for example to the uppermost antenna 905 or a portion thereof, for example.

Although in the embodiments described above, the same antenna assembly is used both for transmitting and receiving RF signals, in other embodiments, one antenna assembly may be used for transmitting RF signals and another may be used for receiving RF signals. Similarly, although in the embodiments described above, the phase adjusters of the phase controller may be used both for transmitted and received signals, in other embodiments, one phase adjuster may be used for transmit signals and another phase adjuster may be used for received signals.

Although in the embodiments described above, the transmitter and receiver are implemented in the same transceiver module, in other embodiments, the transmitter and receiver sections may be implemented in separate modules and either have a shared controller or separate controllers. Two or more antennas of the antenna assembly may have the same physical characteristics and operational bandwidth limitations. For example, if two or more antennas are dipole antennas, the dipole antennas may be the same length. In other embodiments, the antennas may have different physical characteristics and different operational bandwidth limitations. In some embodiments, the antenna assembly may be structured to direct emitted RF radiation in a direction other than orthogonal to the axis of the antennas, for example, by including one or more of the features described above with reference to FIGS. 16A and 16B.

Although in the embodiments described above, the distribution of RF energy in the vertical plane is varied by adjusting the phase between RF signals either received or emitted from antennas of the antenna assembly, the distribution may be varied in any other suitable manner. For example, the distribution of RF energy in a vertical plane may be varied by varying the physical distance between antennas within the antenna assembly and/or by relative movement of one or more coupling members as, for example, described above with reference to FIG. 16B.

In other embodiments, the antenna means may comprise two or more antenna assemblies, each having a different radiation pattern in the vertical plane (e.g. different angle and/or different spread angle), the radiation pattern may be varied by activating different antenna assemblies. One or more assemblies may have a static radiation pattern, or a variable radiation pattern (e.g. through a phase controller for example). The antenna assemblies may be physically separated from each other vertically and/or laterally (e.g. horizontally). In one non-limiting example, antenna assemblies may each produce a differently directed radiation pattern in the vertical plane, where one or more assemblies produce a more downwardly directed pattern than one or more other antenna assemblies.

In any embodiment, one or more antennas may be vertically or cross-polarized. Cross-polarization has the benefit of mitigating spatial nulls caused by multi-path cancellation. Although fading will typically provide some gain for situations involving unmatched polarization, polarization diversity may enhance the performance irrespective of whether the vehicle or other support structure is stationary or moving.

In any embodiments, any antenna which is designed to operate at a frequency of greater than or equal to about 200 MHz or another frequency which is substantially reflected or scattered by the support structure may be arranged so that a direct path or line of sight exists between at least a portion of the antenna and one or more critical positions spaced a predetermined distance from either the center of or a peripheral edge of the support structure. In any embodiments, the antenna assembly may include a housing for accommodating the antennas and which is adapted to substantially prevent the ingress of moisture and/or particulate matter from the ambient.

Other aspects and embodiments of the present invention comprise any one or more features disclosed herein in combination with any one or more other features disclosed herein.

In any aspect or embodiment of the invention, any one or more features may be omitted altogether or substituted by another feature which may or may not be an equivalent or variant thereof.

Modifications to the embodiments described above will be apparent to those skilled in the art.

The invention claimed is:

1. An apparatus comprising antenna means mounted on a moving vehicle for transmitting RF radiation and being structured to enable the distribution of RF energy emitted therefrom to be varied in the vertical plane, signal generator means for generating an RF signal and adapted to pass said signal to said antenna means, a controller arranged to control the distribution of RF energy emitted from the antenna in the vertical plane;

said controller includes receiving means for receiving a control signal, and said controller is adapted to control said distribution of RF energy based on said control signal;

determining means for determining the position of an object and the positional relationship between an object and the apparatus;

wherein said control signal contains information indicative of the position of said object and the positional relationship between said object and said antenna means;

wherein said controller is adapted to steer the distribution of RF energy emitted from said antenna means towards said object based on said control signal; and a support for supporting said antenna means at an elevated position above a surface, said support being adapted for mounting on a predetermined support structure positioned on said surface, the support structure having a peripheral edge at an elevated position above the surface, wherein the support is adapted to support the antenna at a sufficient height above said surface, when mounted on said support structure, to provide a direct path for electromagnetic radiation from at least a portion of the antenna means to a position on the surface and spaced externally of the peripheral edge of the support structure, said position being any one or more of (1) a position of less than or equal to about 3.6 to 4.5 meters from substantially any point on the peripheral edge, (2) a position at any point between opposed ends of said support structure which is spaced about 2.5 to 3 meters or less from a side of said support structure, (3) a position of about 2.5 to 3 meters or less from a side of the support structure and about 2.5 to 3 meters or less from one or both ends of the support structure, and (4) a position of about 2.5 to 3 meters from an end of said support structure and between a side of the support structure and about 2.5 to 3 meters from said side.

2. An apparatus as claimed in claim 1, further comprising a receiver for receiving an RF signal, and wherein said determining means is adapted to determine said positional relationship based on said received RF signal.

3. An apparatus as claimed in claim 2, further comprising detector means for detecting a parameter of said received RF signal, and wherein said determining means is adapted to determine said positional relationship based on said parameter.

4. An apparatus as claimed in claim 3, wherein said parameter is signal strength.

5. An apparatus as claimed in claim 4, further comprising comparing means for comparing the signal strength with a predetermined threshold value.

6. An apparatus as claimed in claim 5, wherein said determining means is adapted to determine said positional relationship based on the result of the comparison made by said comparing means.

7. An apparatus as claimed in claim 6, further comprising means for enabling said threshold value to be varied.

8. An apparatus as claimed in claim 7, comprising storage means for storing a plurality of different threshold values.

9. An apparatus as claimed in claim 8, wherein each threshold value is derived from a source of known signal strength.

10. An apparatus as claimed in claim 9, wherein at least one source comprises one of a fixed position RF transmitter and a mobile RF transmitter.

11. An apparatus as claimed in claim 3, further comprising comparing means for comparing said parameter with one or more threshold values of said parameter.

12. An apparatus as claimed in claim 11, further comprising means for enabling the threshold value of said parameter to be varied.

13. An apparatus as claimed in claim 12, further comprising means for detecting a change in the value of said parameter and for selecting a threshold value based on said change.

14. An apparatus as claimed in claim 13, wherein said detecting means is adapted for detecting a direction of change in said parameter and said selection means is adapted to select the value of a threshold based on the detected direction of change in said parameter.

15. An apparatus as claimed in claim 14, wherein said determining means is adapted to determine the positional relationship based on a comparison made by said comparing means.

16. An apparatus as claimed in claim 15, wherein said parameter is indicative of the strength of the received signal.

17. An apparatus as claimed in claim 16, wherein said controller is adapted to vary the distribution of RF energy between a first distribution and a second distribution, wherein the second distribution of RF energy emitted from the antenna is biased downwardly relative to said first distribution.

18. An apparatus as claimed in claim 17, wherein said controller is arranged to select said first distribution if said received signal strength is at or below a predetermined threshold value.

19. An apparatus as claimed in claim 18, further comprising means for detecting the direction of change of said signal strength, and said controller is arranged to select said first distribution if the signal strength is decreasing with time.

20. An apparatus as claimed in claim 18, further comprising means for measuring a rate of change in signal strength, and said controller is arranged to select said first distribution if the measured rate of change is below a predetermined threshold value.

21. An apparatus as claimed in claim 20, wherein said controller is arranged to select said second distribution if said signal strength is at or above a predetermined value.

22. An apparatus as claimed in claim 21, further comprising a detector for detecting the direction of change in signal strength, and said controller is arranged to select said second distribution if the signal strength increases with time.

23. An apparatus as claimed in claim 17, further comprising a detector for detecting the rate of change of said signal strength, wherein said controller is arranged to select said second distribution if said rate of change is at or above a predetermined threshold value.

24. An apparatus as claimed in claim 2, wherein said receiver includes said antenna means, and said antenna means includes first and second antennas.

25. An apparatus as claimed in claim 24, wherein said determining means is adapted to determine said positional relationship based on an RF signal received at said first antenna and an RF signal received at said second antenna.

26. An apparatus as claimed in claim 25, wherein said determining means is adapted to determine said positional relationship based on a phase relationship between the RF signal received at said first antenna and the RF signal received at said second antenna.

27. An apparatus as claimed in claim 26, wherein said determining means comprises detection means for detecting a phase difference between said first and second received RF signals, wherein said detection means comprises a phase changer for changing the phase of an RF signal from one of said first and second antennas relative to the other of said first and second antennas, a combiner for combining the signal from the phase changer with the signal from the other antenna, and a detector for detecting the signal strength of the signal from the combiner.

28. An apparatus as claimed in claim 27, further comprising control means for controlling the phase changer to change the phase of the RF signal from said one antenna.

29. An apparatus as claimed in claim 28, further comprising recording means for recording a first signal strength from said combiner when said phase changer is in a first state, and wherein said controller is adapted automatically to change the phase of the signal after said first signal strength has been recorded by said recording means, and comparing means for comparing the first signal strength with the signal strength from the combiner after the phase of the signal has been changed.

30. An apparatus as claimed in claim 24, wherein said first and second antennas each have an upper end, and wherein the upper end of said first antenna is positioned above the upper end of said second antenna.

31. An apparatus as claimed in claim 24, wherein each of said first and second antennas have a lower end, and the lower end of said second antenna is below the lower end of said first antenna.

32. An apparatus as claimed in claim 24, wherein said first and second antennas are substantially coaxially aligned.

33. An apparatus as claimed in claim 24, wherein said first and second antennas are structured for transmission of frequencies within a frequency band having the same upper and lower limits.

34. An apparatus as claimed in claim 1, wherein said antenna means is structured to transmit RF radiation substantially uniformly in all directions in the horizontal plane.

35. An apparatus as claimed in claim 1, wherein said control signal is transmitted from a device remote from or which is not co-located with said apparatus.

36. An apparatus as claimed in claim 1, wherein said determining means determines said positional information of said object based on one or more parameters of a received RF signal.

37. An apparatus as claimed in claim 36, wherein said parameter(s) comprises any one or more of (1) strength of the RF signal, (2) direction of change of the RF signal strength, (3) rate of change of the RF signal strength, (4) rate of the rate of change of the RF signal strength, (5) phase difference between two or more received RF signals, (6) the direction of change of phase difference between two or more received RF signals, (7) rate of change of phase difference between two or more received RF signals and (8) rate of the rate of change of phase difference between two or more received RF signals.

38. An apparatus as claimed in claim 2, wherein the RF signal is transmitted by any one or more of (1) the object and (2) a device associated for controlling the object.

39. An apparatus as claimed in claim 38, wherein the object is an explosive device or a data communication device.

40. An apparatus as claimed in claim 39, further comprising detector means for detecting an object, and wherein said controller is arranged to control the distribution of RF energy based on the position of the object.

41. An apparatus as claimed in claim 40, wherein said detector means is adapted to detect the object by any one or more of optical means, infrared means, any visual characteristic or other signature of said object and by prediction.

42. An apparatus as claimed in claim 41, wherein said antenna means comprises a plurality of antennas, including a first antenna and a second antenna, at least a portion of the first antenna being at a different vertical position to the second antenna.

43. An apparatus as claimed in claim 42, comprising means for passing from said signal generating means, a first signal to said first antenna and a second signal to said second antenna.

44. An apparatus as claimed in claim 43, wherein said passing means comprises a splitter for splitting a signal from said generator means into said first and second signals.

45. An apparatus as claimed in claim 44, wherein said controller comprises a phase changer for changing the phase relationship between said first signal and said second signal.

46. An apparatus as claimed in claim 45, wherein said phase changer is capable of varying the phase between the first and second signals for a given frequency between three or more values.

47. An apparatus as claimed in claim 46, wherein said phase changer comprises one or more delay lines and means for varying the phase over continuous values.

48. An apparatus as claimed in claim 47, wherein said first and second signals have either the same or different strengths.

49. An apparatus as claimed in claim 48, comprising means for controlling the signal strength of a signal to at least one of said plurality of antennas independently of the strength of a signal to at least one other of said antennas.

50. An apparatus as claimed in claim 1, wherein said antenna means comprises an array of a plurality of antennas each positioned at a different level, and said at least a portion of said antenna means includes a mid region, main radiating region or radiating centre of the array.

51. An apparatus as claimed in claim 1, further comprising means for varying the selection of which one or more of said plurality of antennas to pass a signal from said signal generator means.

* * * * *